United States Patent
Koida et al.

(10) Patent No.: US 10,481,370 B2
(45) Date of Patent: Nov. 19, 2019

(54) OPTICAL SYSTEM, OPTICAL APPARATUS, AND METHOD FOR MANUFACTURING THE OPTICAL SYSTEM

(71) Applicant: Nikon Corporation, Tokyo (JP)

(72) Inventors: Keigo Koida, Kawasaki (JP); Atsushi Suzuki, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 14/426,754

(22) PCT Filed: Feb. 13, 2014

(86) PCT No.: PCT/JP2014/000739
§ 371 (c)(1),
(2) Date: Mar. 8, 2015

(87) PCT Pub. No.: WO2014/129149
PCT Pub. Date: Aug. 28, 2014

(65) Prior Publication Data
US 2015/0241666 A1  Aug. 27, 2015

(30) Foreign Application Priority Data

Feb. 19, 2013 (JP) ................................. 2013-029582
Feb. 19, 2013 (JP) ................................. 2013-029583

(51) Int. Cl.
*G02B 9/62* (2006.01)
*G02B 13/04* (2006.01)
(Continued)

(52) U.S. Cl.
CPC ............ *G02B 13/04* (2013.01); *G02B 7/021* (2013.01); *G02B 13/18* (2013.01); *Y10T 29/49826* (2015.01)

(58) Field of Classification Search
CPC ...................................................... G02B 7/021
(Continued)

(56) References Cited

U.S. PATENT DOCUMENTS 3,874,770 A   4/1975  Shimizu
3,926,503 A * 12/1975 Takahashi .............. G02B 13/00
                                                       359/752
(Continued)

FOREIGN PATENT DOCUMENTS

CN    101855584 A     10/2010
JP    S43-013833       6/1968
(Continued)

OTHER PUBLICATIONS

International Search Report from International Patent Application No. PCT/JP2014/000739, dated Apr. 15, 2014.
(Continued)

*Primary Examiner* — Stephone B Allen
*Assistant Examiner* — Travis Fissel
(74) *Attorney, Agent, or Firm* — Shapiro, Gabor and Rosenberger, PLLC

(57) ABSTRACT

An optical system has, in order from an object: a first lens having negative refractive power; a second lens having positive refractive power; a third lens having positive refractive power; a fourth lens having negative refractive power; a fifth lens having negative refractive power; and a sixth lens having positive refractive power, wherein the following conditional expression (1) is satisfied: $1.52 < L3R1/f3$ - - - (1), where L3R1 denotes a radius of curvature of an object side lens surface of the third lens L3, and f3 denotes a focal length of the third lens L3.

22 Claims, 24 Drawing Sheets

(EXAMPLE 1)

(51) Int. Cl.
*G02B 13/18* (2006.01)
*G02B 7/02* (2006.01)

(58) Field of Classification Search
USPC ....... 359/713, 752, 756, 658, 746, 745, 747, 359/688
See application file for complete search history.

(56) References Cited

U.S. PATENT DOCUMENTS

| | | | |
|---|---|---|---|
| 4,056,307 A * | 11/1977 | Rayces | G02B 13/08 |
| | | | 359/671 |
| 5,272,566 A | 12/1993 | Aoki | |
| 5,682,269 A * | 10/1997 | Kimura | G02B 9/60 |
| | | | 359/752 |
| 5,805,359 A | 9/1998 | Yamanashi | |
| 2003/0099043 A1* | 5/2003 | Takeuchi | G02B 15/177 |
| | | | 359/682 |
| 2005/0280902 A1* | 12/2005 | Itoh | G02B 15/177 |
| | | | 359/689 |
| 2007/0070523 A1 | 3/2007 | Noda | |
| 2007/0171544 A1* | 7/2007 | Noda | G02B 15/177 |
| | | | 359/689 |
| 2009/0161227 A1 | 6/2009 | Yamamoto et al. | |
| 2009/0257132 A1 | 10/2009 | Hayakawa et al. | |
| 2010/0149653 A1* | 6/2010 | Wada | G02B 27/0062 |
| | | | 359/682 |
| 2010/0157439 A1* | 6/2010 | Luo | G02B 15/177 |
| | | | 359/689 |
| 2010/0265380 A1 | 10/2010 | Fukuta | |
| 2011/0080659 A1 | 4/2011 | Kurashige | |
| 2012/0127590 A1 | 5/2012 | Muratani et al. | |
| 2012/0147485 A1 | 6/2012 | Kubota | |
| 2013/0222925 A1 | 8/2013 | Onozaki et al. | |
| 2013/0265648 A1 | 10/2013 | Saori | |

FOREIGN PATENT DOCUMENTS

| | | |
|---|---|---|
| JP | 49-017724 A | 2/1974 |
| JP | 58-001118 A | 1/1983 |
| JP | 60-080816 A | 5/1985 |
| JP | 61-241719 A | 10/1986 |
| JP | H03-215808 A | 9/1991 |
| JP | 03-0241306 A | 10/1991 |
| JP | 03-293612 A | 12/1991 |
| JP | 05-150161 A | 6/1993 |
| JP | 06-082689 A | 3/1994 |
| JP | 08-313802 A | 11/1996 |
| JP | 09-113809 A | 5/1997 |
| JP | H09-297262 A | 11/1997 |
| JP | 2000-267009 A | 9/2000 |
| JP | 2002-098894 A | 4/2002 |
| JP | 2003-114386 A | 4/2003 |
| JP | 2005-084456 A | 3/2005 |
| JP | 2005-141017 A | 6/2005 |
| JP | 2005-250171 A | 9/2005 |
| JP | 2007-093961 A | 4/2007 |
| JP | 2008-040033 A | 2/2008 |
| JP | 2009-042700 A | 2/2009 |
| JP | 2009-047722 A | 3/2009 |
| JP | 2009-150970 A | 7/2009 |
| JP | 2009-156891 A | 7/2009 |
| JP | 2009-251568 A | 10/2009 |
| JP | 2010-060919 A | 3/2010 |
| JP | 2011-076021 A | 4/2011 |
| JP | 2012-008347 A | 1/2012 |
| JP | 2012-022300 A | 2/2012 |
| JP | 2012-068348 A | 4/2012 |
| JP | 2012-128045 A | 7/2012 |
| JP | 2013-130820 A | 7/2013 |
| JP | 2013-210604 A | 10/2013 |
| JP | 2013-231941 A | 11/2013 |
| WO | WO 2009/063766 A1 | 5/2009 |

OTHER PUBLICATIONS

Decision of Refusal dated Nov. 14, 2017, in Japanese Patent Application No. 2013-029582.
Decision to Decline the Amendment dated Nov. 14, 2017, in Japanese Patent Application No. 2013-029582.
Examination Report dated May 17, 2018, in Indian Patent Application No. 1906/DELNP/2015.
Office Action dated Feb. 26, 2019, in Japanese Patent Application No. 2018-024096.
English translation of International Preliminary Report on Patentability for International Patent Application No. PCT/JP2014/000739, Sep. 3, 2015.

* cited by examiner

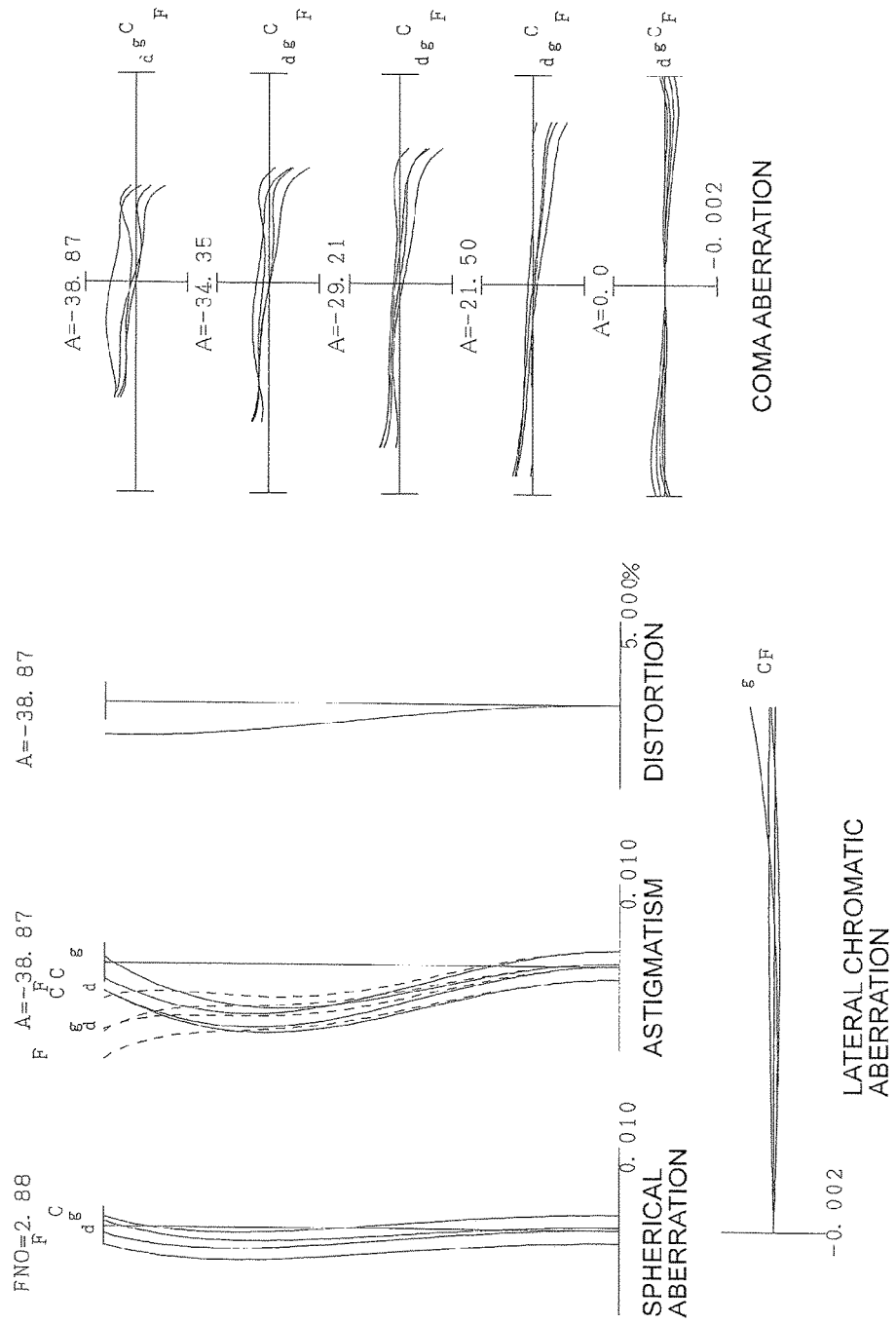

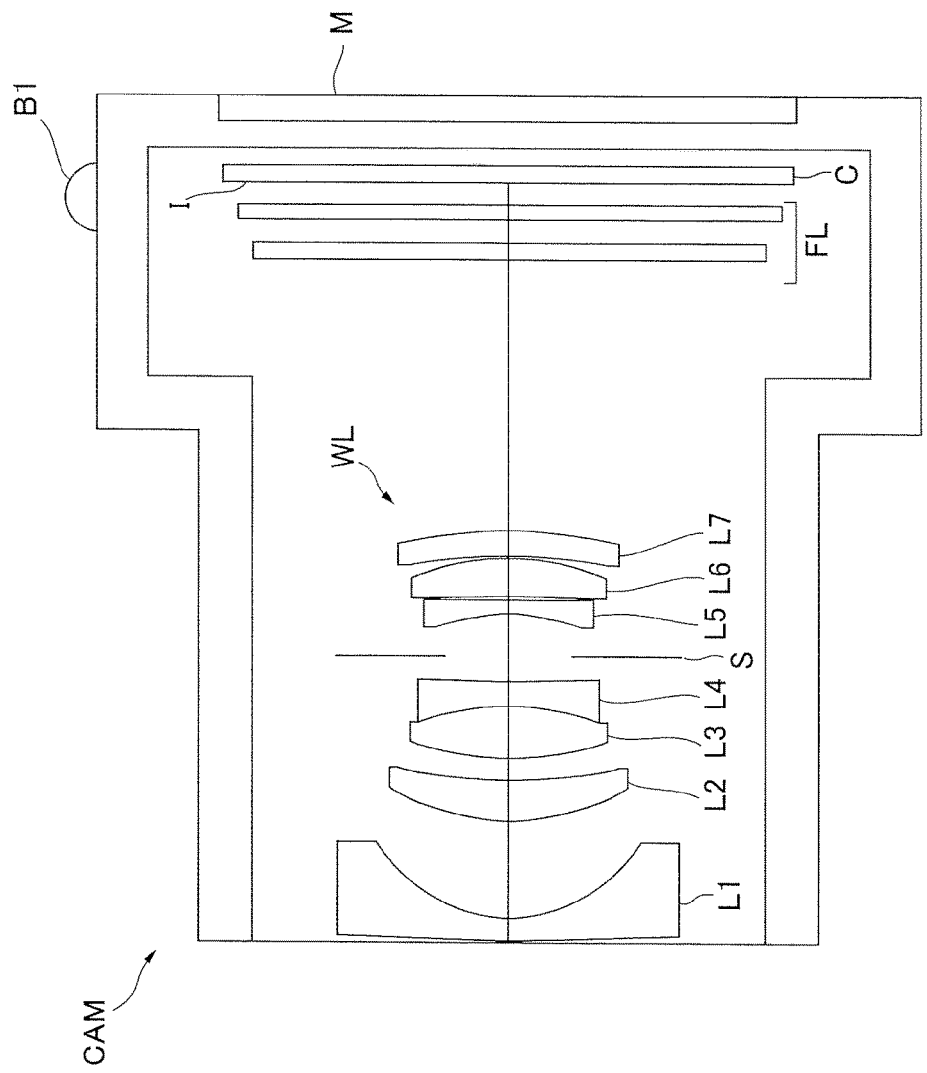

OPTICAL SYSTEM, OPTICAL APPARATUS, AND METHOD FOR MANUFACTURING THE OPTICAL SYSTEM

TECHNICAL FIELD

The present invention relates to an optimum optical system for an image capturing optical system, such as a digital camera, film camera and video camera.

TECHNICAL BACKGROUND

In recent years, compact single focus lenses having a wide angle of view have been proposed (e.g. see Patent Document 1). Most zoom lenses used for compact digital cameras lately use so-called retractable type lens barrels, where the lens barrel retracts into the camera when the camera is not used. Further, just like a zoom lens, a wide angle single focus lens having a wide angle of view which can retract the lens barrel into the camera when the camera is not used, and of which focal length does not change with respect to an object point at infinity, has also been proposed (e.g. see Patent Document 2).

PRIOR ARTS LIST

Patent Documents

Patent Document 1: Japanese Laid-Open Patent Publication No. 2011-076021 (A)
Patent Document 2: Japanese Laid-Open Patent Publication No. 2008-40033 (A)

SUMMARY OF THE INVENTION

Problems to be Solved by the Invention

However, a conventional wide angle lens has an optical system of which total length is long, and has a large front lens diameter. Therefore using this lens for a compact camera, which can retract the lens barrel into the camera when the camera is not used, is not advantageous in downsizing this camera. Further, the conventional single focus wide angle lens does not have sufficient brightness, and has an optical system of which total length is long.

With the foregoing in view, it is an object of the present invention to provide an optical system and an optical apparatus having compactness and high optical performance, and a method for manufacturing the optical system.

Means to Solve the Problems

To achieve this object, an optical system according to a first aspect of the invention has, in order from an object: a first lens having negative refractive power; a second lens having positive refractive power; a third lens having positive refractive power; a fourth lens having negative refractive power; a fifth lens having negative refractive power; and a sixth lens having positive refractive power, wherein the following conditional expression is satisfied.

$$1.52 < L3R1/f3$$

where L3R1 denotes a radius of curvature of an object side lens surface of the third lens, and f3 denotes a focal length of the third lens.

In the optical system according to the first aspect of the invention, it is preferable that the first lens is a negative meniscus lens having a concave surface facing the image.

In the optical system according to the first aspect of the invention, it is preferable that the third lens and the fourth lens constitute a cemented lens, and satisfy the following conditional expression.

$$0.10 < n3 - n4 < 0.30$$

where n3 denotes a refractive index of a material of the third lens at the d-line, and n4 denotes a refractive index of a material of the fourth lens at the d-line.

In the optical system according to the first aspect of the invention, it is preferable that the second lens is a positive meniscus lens having a convex surface facing the object.

In the optical system according to the first aspect of the invention, it is preferable that the following conditional expression is satisfied.

$$1.00 < \Sigma d/f < 1.30$$

where $\Sigma d$ denotes a distance on the optical axis from a lens surface closest to the Object to a lens surface closest to the image in the optical system, and f denotes a focal length of the total lens system.

In the optical system according to the first aspect of the invention, it is preferable that a lens surface closest to the image is aspherical.

An optical apparatus according to the first aspect of the invention includes any one of the above mentioned optical systems.

A method for manufacturing the optical system according to the first aspect of the invention is a method for manufacturing an optical system including, in order from an object, a first lens having negative refractive power, a second lens having positive refractive power, a third lens having positive refractive power, a fourth lens having negative refractive power, a fifth lens having negative refractive power, and a sixth lens having positive refractive power, wherein each lens is assembled in a lens barrel so as to satisfy the following conditional expression.

$$1.52 < L3R1/f3$$

where L3R1 denotes a radius of curvature of an object side lens surface of the third lens, and f3 denotes a focal length of the third lens.

An optical system according to a second aspect of the invention has, in order from an object: a first lens having negative refractive power; a second lens having positive refractive power; a third lens having positive refractive power; a fourth lens having negative refractive power; a fifth lens having negative refractive power; and a sixth lens having positive refractive power, wherein the following conditional expression is satisfied.

$$0.88 < L4R2/f$$

where L4R2 denotes a radius of curvature of an image side surface of the fourth lens, and f denotes a focal length of the total lens system.

In the optical system according to the second aspect of the invention, it is preferable that the following conditional expression is satisfied.

$$-1.450 < (L5R1 + L4R2)/(L5R1 - L4R2) < -0.310$$

where L5R1 denotes a radius of curvature of an object side surface of the fifth lens.

In the optical system according to the second aspect of the invention, it is preferable that the following conditional expression is satisfied.

$$L3f/f < 0.56$$

where L3f denotes a focal length of the third lens.

In the optical system according to the second aspect of the invention, it is preferable that the first lens is a negative meniscus lens having a concave surface facing the image.

In the optical system according to the second aspect of the invention, it is preferable that an image side surface of the lens located closest to the image is aspherical.

An optical apparatus according to the second aspect of the invention includes any one of the above mentioned optical systems.

A method for manufacturing the optical system according to the second aspect of the invention is a method for manufacturing an optical system including, in order from an object, a first lens having negative refractive power, a second lens having positive refractive power, a third lens having positive refractive power, a fourth lens having negative refractive power, a fifth lens having negative refractive power, and a sixth lens having positive refractive power, wherein each lens is assembled in a lens barrel so as to satisfy the following conditional expression.

$$0.88 < L4R2/f$$

where L4R2 denotes a radius of curvature of an image side surface of the fourth lens, and f denotes a focal length of the total lens system.

Advantageous Effects of the Invention

The present invention can provide an optical system and an optical apparatus which are compact and have high optical performance, and a method for manufacturing the optical system.

BRIEF DESCRIPTION OF THE DRAWINGS

FIG. 12 are graphs showing various aberrations of the optical system according to Example 6 upon focusing on infinity;

FIG. 13 show a digital camera (optical apparatus) including the optical system according to this embodiment represented by Examples 1 to 6, where

FIG. 14 is a cross-sectional view along the A-A' line in FIG. 13A;

FIG. 22 show a digital camera (optical apparatus) including the optical system according to this embodiment represented by Examples 7 to 9, where

DESCRIPTION OF THE EMBODIMENTS

Embodiment 1 will now be described with reference to the drawings.

Figure 1:
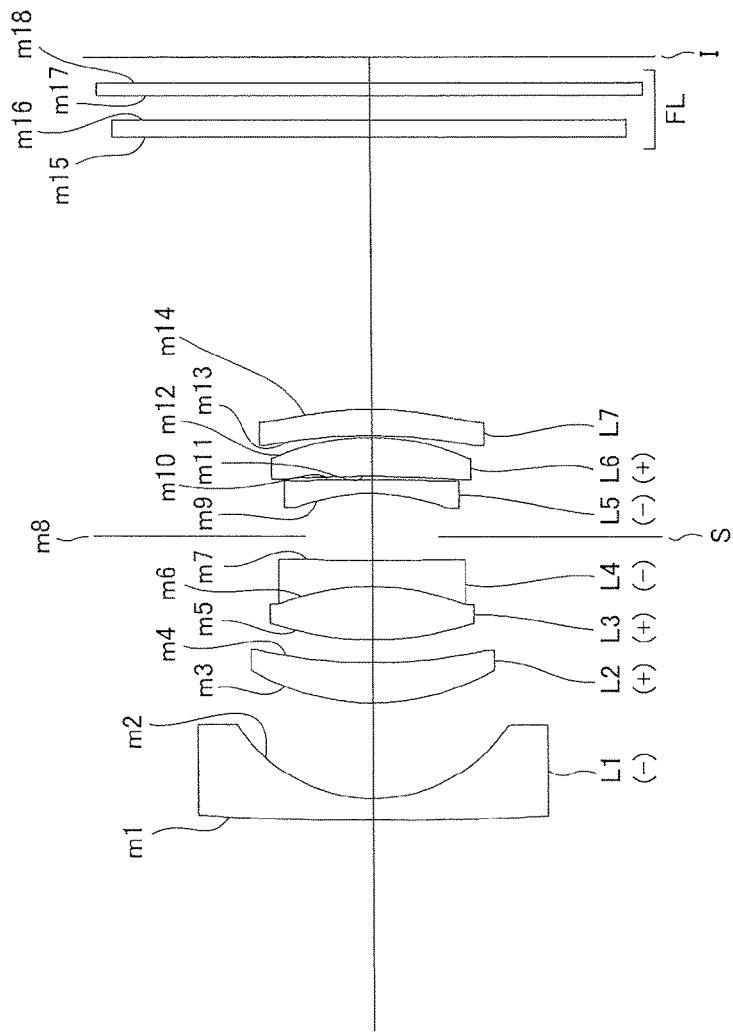
FIG. 1 is a cross-sectional view depicting a configuration of an optical system according to Example 1.

As illustrated in FIG. 1, an optical system WL of Embodiment 1 has, in order from an object, a first lens L1 having negative refractive power, a second lens L2 having positive refractive power, a third lens L3 having positive refractive power, a fourth lens L4 having negative refractive power, a fifth lens L5 having negative refractive power, and a sixth lens L6 having positive refractive power, wherein the following conditional expression (1) is satisfied.

$$1.52 < L3R1/f3 \qquad (1)$$

where L3R1 denotes a radius of curvature of an object side surface of the third lens L3, and f3 denotes a focal length of the third lens L3.

In designing an imaging optical system, such as a photograph lens, normally it is difficult to decrease the total lens length and the lens thickness while maintaining the angle of view and Fno, since correcting various aberrations becomes difficult. In the optical system WL according to this embodiment which has the above configuration, various aberrations including the spherical aberration can be satisfactorily corrected while implementing downsizing by decreasing both the total lens length and the lens thickness.

The conditional expression (1) specifies the ratio of the radius of curvature of the object side lens surface of the third lens L3 and the focal length of the third lens L3. By satisfying the conditional expression (1), performance deterioration upon assembling the lens barrel can be prevented while correcting the spherical Aberration and coma aberration satisfactorily. If the lower limit value of the conditional expression (1) is not reached, the radius of curvature of the object side lens surface of the third lens L3 becomes small with respect to the focal length of the third lens L3, which is advantageous for correcting the spherical aberration and the coma aberration, but makes it difficult to implement the accuracy upon assembling the lens barrel and makes manufacturing the optical system WL difficult.

To demonstrate the effect of this embodiment with certainty, it is preferable that the upper limit value of the conditional expression (1) is 5.00. To demonstrate the effect of this embodiment to the maximum, it is preferable that the upper limit value of the conditional expression (1) is 3.00.

In the optical system WL according to this embodiment, it is preferable that the first lens L1 is a negative meniscus lens having a concave surface facing the image. By this configuration, various aberrations can be corrected satisfactorily in the total lens system while decreasing distortion generated in the first lens L1.

In the optical system WL according to this embodiment, it is preferable that the third lens L3 and the fourth lens L4 constitute a cemented lens, and the following conditional expression (2) is satisfied.

$$0.10 < n3 - n4 < 0.30 \quad (2)$$

where n3 denotes a refractive index of a material of the third lens L3 at the d-line, and n4 denotes a refractive index of a material of the fourth lens L4 at the d-line.

The conditional expression (2) specifies the refractive index difference between the materials of the third lens L3 and the fourth lens L4 that constitute the cemented lens. If the upper limit value of the conditional expression (2) is exceeded, the refractive index difference between the materials of the third lens L3 and the fourth lens L4 increases, which is advantageous to correct the Petzval sum and curvature of field, but makes it difficult to correct the spherical aberration. If the lower limit value of the conditional expression (2) is not reached, this state may be advantageous for correcting the spherical aberration but increases the Petzval sum and makes it difficult to correct the curvature of field.

To demonstrate the effect of this embodiment with certainty, it is preferable that the upper limit value of the conditional expression (2) is 0.25. To demonstrate the effect of this embodiment with certainty, it is preferable that the lower limit value of the conditional expression (2) is 0.11.

In the optical system WL according to this embodiment, it is preferable that the second lens L2 is a positive meniscus lens having a convex surface facing the object. By this configuration, spherical aberration, astigmatism and coma aberration can be satisfactorily corrected while satisfactorily correcting distortion generated in the first lens L1.

In the optical system WL according to this embodiment, it is preferable that the following conditional expression (3) is satisfied.

$$1.00 < \Sigma d/f < 1.30 \quad (3)$$

where $\Sigma d$ denotes a distance on the optical axis from a lens surface closest to the object to a lens surface closest to the image in the optical system WL, and f denotes a focal length of the total lens system.

The conditional expression (3) specifies an appropriate lens thickness to balance downsizing of the optical system and correcting aberrations. If the value $\Sigma d$ becomes too large and the upper limit value of the conditional expression (3) is exceeded, this state may be advantageous in terms of correcting various aberrations including coma aberration and implement high optical performance, but the lens thickness becomes too thick, which is not appropriate for downsizing. If the value f becomes too small and the upper limit value of the conditional expression (3) is exceeded, then coma aberration and distortion are affected. If the lower limit value of the conditional expression (3) is not reached, on the other hand, the lens thickness decreases, which is advantageous for downsizing, but correction of various aberrations, including coma aberration, becomes difficult, and high performance cannot be implemented, which is not preferable.

To demonstrate the effect of this embodiment with certainty, it is preferable that the upper limit value of the conditional expression (3) is 1.27. To demonstrate the effect of this embodiment with certainty, it is preferable that the lower limit value of the conditional expression (3) is 1.05.

In the optical system WL according to this embodiment, it is preferable that the lens surface closest to the image (image side lens surface m14 of the seventh lens L7 in the case of FIG. 1) is aspherical. By this configuration, spherical aberration, astigmatism and coma aberration can be corrected satisfactorily in the total lens system, while implementing downsizing.

According to the optical system WL having the above mentioned configuration of this embodiment, an optical system with which the lens barrel can be retracted into the camera when the camera is not used, but which still has compactness, wide angle of view, brightness and high optical performance can be implemented. Furthermore, a slimmer camera can be implemented by minimizing thickness of the lens barrel portion in the retracted state.

Figure 13A:
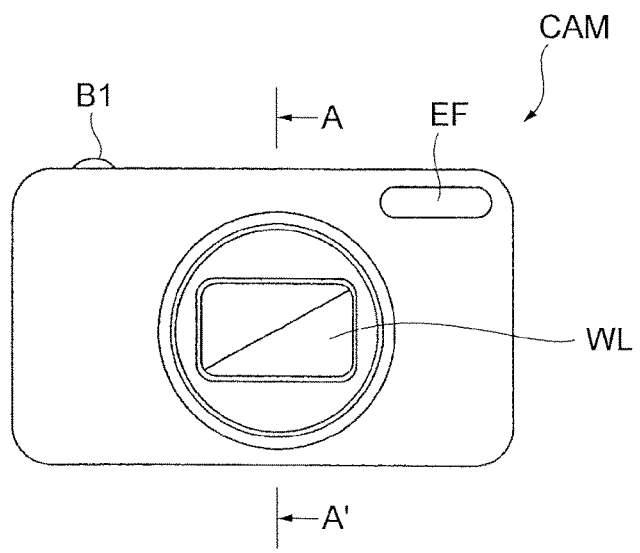
FIG. 13A is a front view and FIG. 13B is a rear view.
Figure 13B:
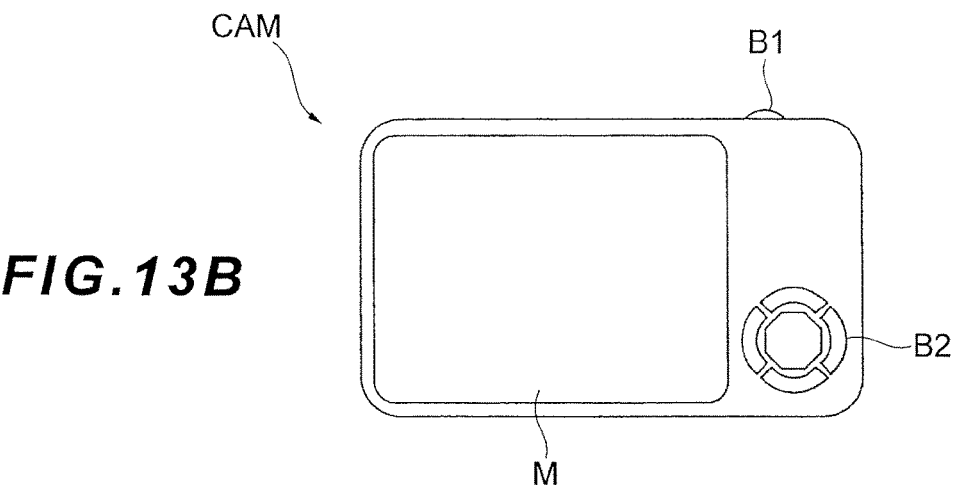

FIG. 13 and FIG. 14 show a configuration of a digital still camera CAM (optical apparatus) as an optical apparatus including the optical system WL described above. In the digital still camera CAM, if a power button (not illustrated) is pressed, a shutter (not illustrated) of the image capturing lens (optical system WL) is opened, and light from an object is collected by the optical system WL and forms an image on a picture element C (e.g. CCD, CMOS) disposed on the image plane I (see FIG. 1). The object image formed on the picture element C is displayed on a liquid crystal monitor M, which is disposed on the rear face of the digital still camera CAM. The user determines a composition while viewing the liquid crystal monitor M, then presses a release button B1 to photograph the object image using the picture element C, and records and stores the image in a memory (not illustrated).

In the camera CAM, an auxiliary light emitting unit EF that emits auxiliary light when an object appears dark and a function button B2 that is used to set various conditions of the digital still camera CAM are disposed. Here a compact type camera, where the camera CAM and the optical system WL are integrated, is shown as an example, but the optical apparatus may be a single lens reflex camera, where the lens barrel having the optical system WL and a camera body are detachable.

According to the camera CAM having the above configuration, where the optical system WL is included as the image-capturing lens, a camera in which the lens barrel can be retracted into the camera when the camera is not used but which still has compactness, wide angle of view, brightness and high optical performance, can be implemented. Furthermore, a slimmer camera can be implemented by minimizing the thickness of the lens barrel portion in the retracted state.

Figure 15:
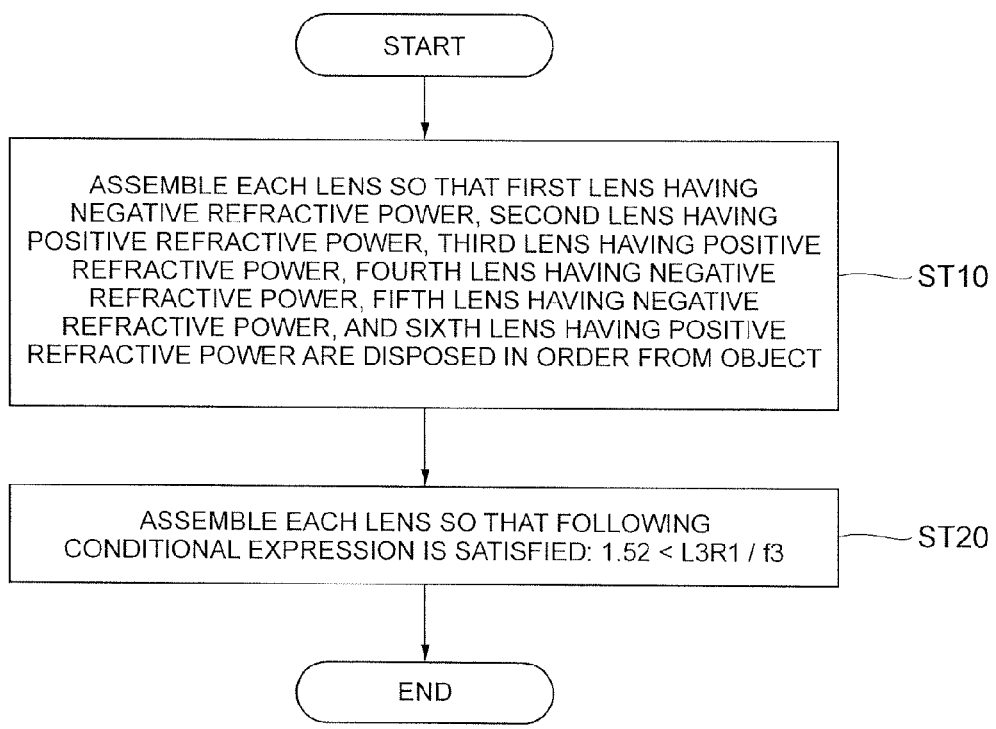
FIG. 15 is a flow chart depicting a method for manufacturing the optical system according to this embodiment represented by Examples 1 to 6.

Now a method for manufacturing the optical system WL will be described with reference to FIG. 15. First each lens is assembled so that in the lens barrel the first lens L1 having negative refractive power, the second lens L2 having positive refractive power, the third lens L3 having positive refractive power, the fourth lens L4 having negative refractive power, the fifth lens L5 having negative refractive power, and the sixth lens L6 having positive refractive power are disposed in order from the object (step ST10). In this step, each lens is assembled so that the following conditional expression (1) is satisfied (step ST20).

$$1.52 < L3R1/f3 \quad (1)$$

where L3R1 denotes a radius of curvature of an object side lens surface of the third lens L3, and f3 denotes a focal length of the third lens L3.

As an example of the lens configuration according to this embodiment, as illustrated in the optical system WL (WL1) in FIG. 1, each member is assembled in the lens barrel so that a negative meniscus lens having a convex surface facing the object as the first lens L1 having negative refractive power, a positive meniscus lens having a convex surface facing the object as the second lens L2 having positive refractive power, a biconvex positive lens as the third lens L3 having positive refractive power, a biconcave negative lens as the fourth lens L4 having negative refractive power, a negative meniscus lens having a concave surface facing the image as the fifth lens L5 having negative refractive power, a positive meniscus lens having a convex surface facing the image as the sixth lens L6 having positive refractive power, a positive meniscus lens having a convex surface facing the image as the seventh lens L7, and a filter group FL are disposed in this order. The biconvex positive lens L3 and the biconcave negative lens L4 constitute a cemented lens. The optical system WL satisfies the conditional expression (1) (corresponding value: 1.820).

According to the method for manufacturing the optical system WL of this embodiment, an optical system with which the lens barrel can be retracted into the camera when the camera is not used, but which still has compactness, wide angle of view, brightness and high optical performance can be implemented. Furthermore, an optical system that can contribute to a slimmer camera can be implemented by minimizing thickness of the lens barrel portion in the retracted state.

Example (1)

Each example of Embodiment 1 will now be described with reference to the drawings.

Each reference symbol in FIG. 1 related to Example 1 is independent from the other examples in order to prevent a complication of descriptions caused by an increase in the number of digits of a reference symbol. Therefore even if a reference symbol in a drawing for Example 1 is the same as that in a drawing for another example, this does not necessarily mean that composing elements in these examples are the same.

In each example, the aberration characteristics are calculated with respect to the C-line (wavelength: 656.2730 nm), the d-line (wavelength: 587.5620 nm), the F-line (wavelength: 486.1330 nm) and the g-line (wavelength: 435.8350 nm).

Table 1 to Table 6 shown below are tables on each data in Example 1 to Example 6.

In [Lens Data] in each table, the surface number is the sequential number of the optical surface counted from the object side in the light traveling direction, R denotes the radius of curvature of each optical surface, D denotes a distance from each optical surface to the next optical surface (or image plane) on the optical axis, nd denotes a refractive index of the material of the optical member with respect to the d-line, and vd denotes an Abbe number of the material of the optical member with respect to the d-line. The object surface indicates the surface of the object, (Variable) indicates a variable surface distance, radius of curvature R=∞ indicates a plane or an aperture, (Stop S) indicates an aperture stop S, and image plane indicates an image plane I. The refractive index of air "1.00000" is omitted. If the optical surface is aspherical, "*" is affixed to the surface number, and the paraxial radius of curvature is shown in the column of the radius of curvature R.

In [Aspherical Data] in each table, a form of the aspherical surface in [Lens Data] is indicated by the following Expression (a). X(y) denotes a distance in the optical axis direction from a tangential plane at a vertex of the aspherical surface to a position on the aspherical surface at height y, r denotes a radius of curvature (paraxial radius of curvature) of the reference spherical surface, K denotes a conical coefficient, and Ai denotes an aspherical coefficient of the i-th order. "E-n" indicates "×10$^{-n}$". For example, 1.234E-05=1.234×10$^{-5}$.

$$X(y)=(y^2/r)/\{1+(1-\kappa \times y^2/r^2)^{1/2}\}+A4 \times y^4+A6 \times y^6+A8 \times y^8+A10 \times y^{10} \quad (a)$$

In [Various Data] in each table, f denotes a focal length of the total lens system, Fno denotes an F number, ω denotes a half angle of view (maximum incident angle, unit: °), Y denotes an image height, BF denotes a back focus (distance from the last surface of the lens to the paraxial image plane on the optical axis, based on air conversion), and TL denotes a total lens length (distance, which is from the first surface of the lens to the last surface of the lens on the optical axis, and which is added with back focus). The above description is the same for the examples of Embodiment 2, which will be described later.

In [Conditional Expression] in each table, a value corresponding to each conditional expression (1) to (3) is shown.

In all the data values herein below, unless specifically indicated, "mm" is normally used as the unit of focal length f, radius of curvature R, surface distance D and other lengths, but the unit is not limited to "mm", and another appropriate unit may be used since an equivalent optical performance is obtained even if the optical system is proportionally expanded or proportionally reduced.

This description on the table is the same for all examples, and is therefore omitted below.

(Example 1)

Example 1 will be described with reference to FIG. 1, FIG. 2 and Table 1. As illustrated in FIG. 1, an optical system WL (WL1) according to Example 1 is a wide angle single focus lens, and has, in order from an object, a first lens L1 which is a negative meniscus lens having a convex surface facing the object, a second lens L2 which is a positive meniscus lens having a convex surface facing the Object, a cemented lens of a third lens L3 which is a biconvex positive lens and a fourth lens L4 which is a biconcave negative lens, an aperture stop S, a fifth lens L5 which is a negative meniscus lens having a concave surface facing the image, a sixth lens L6 which is a positive meniscus lens having a convex surface facing the image, a seventh lens L7 which is a positive meniscus lens having a convex surface facing the image, and a filter group FL. The image side lens surface of the seventh lens L7 is aspherical. The filter group FL is constituted by a low-pass filter, an infrared cut-off filter or the like, in order to cut off the spatial frequency exceeding the critical resolution of a solid-state picture element (e.g. CCD, CMOS) disposed on the image plane I.

Table 1 shows each data value of Example 1. The surface numbers 1 to 18 in Table 1 correspond to each optical surface of m1 to m18 shown in FIG. 1 respectively. In Example 1, surface 14 is aspherical.

TABLE 1

[Lens Data]

| Surface number | R | D | nd | vd |
|---|---|---|---|---|
| Object surface | ∞ | | | |
| 1 | 8.9738 | 0.0649 | 1.51823 | 58.82 |
| 2 | 0.4819 | 0.2865 | | |
| 3 | 0.7445 | 0.1189 | 1.72916 | 54.61 |
| 4 | 1.6219 | 0.0676 | | |
| 5 | 1.0084 | 0.1568 | 1.81600 | 46.59 |
| 6 | −0.7623 | 0.0757 | 1.60342 | 38.03 |
| 7 | 8.5872 | 0.0703 | | |
| 8 (Stop S) | ∞ | 0.1270 | | |
| 9 | −0.6482 | 0.0432 | 1.80809 | 22.74 |
| 10 | −11.2810 | 0.0108 | | |
| 11 | −3.7444 | 0.1135 | 1.81600 | 46.59 |
| 12 | −0.7338 | 0.0054 | | |
| 13 | −1.6423 | 0.0757 | 1.80139 | 45.46 |
| *14 (Aspherical) | −1.0658 | 0.8000 | | |
| 15 | ∞ | 0.0508 | 1.51680 | 64.20 |
| 16 | ∞ | 0.0703 | | |
| 17 | ∞ | 0.0378 | 1.51680 | 64.20 |
| 18 | ∞ | 0.0763 | | |
| Image plane | ∞ | | | |

[Aspherical Data]
Surface 14

κ = 1.0000, A4 = 7.29513E−01, A6 = 3.24822E+00, A8 = 0.00000E+00, A10 = 3.10240E+01

[Various Data]

| f | 1.00 |
|---|---|
| Fno | 2.87 |
| ω | 38.66 |
| Y | 0.78 |
| BF | 1.005 |
| TL | 2.25 |

[Conditional Expressions]

Conditional expression (1) L3R1/f3 = 1.820
Conditional expression (2) n3 − n4 = 0.213
Conditional expression (3) Σd/f = 1.216

As Table 1 shows, the optical system WL1 of Example 1 satisfies the conditional expressions (1) to (3).

Figure 2:
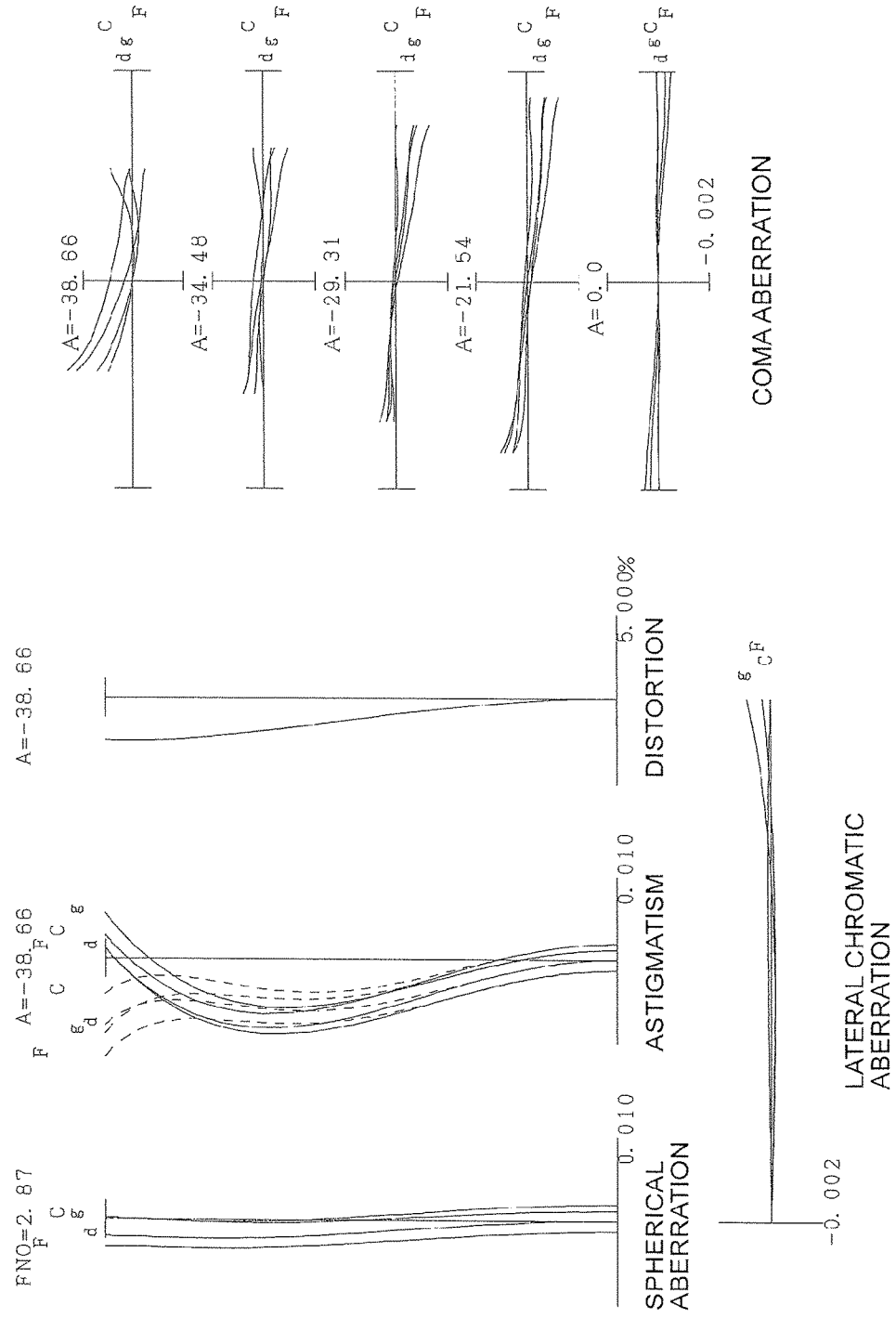
FIG. 2 are graphs showing various aberrations of the optical system according to Example 1 upon focusing on infinity.

FIG. 2 are graphs showing various aberrations (spherical aberration, astigmatism, distortion, coma aberration and lateral Chromatic aberration) of the optical system WL1 according to Example 1 upon focusing on infinity.

In each graph showing aberrations, FNO denotes an F number and A denotes a half angle of view with respect to ech image height (unit: °). d indicates aberration at the d-line, g indicates aberration at the g-line, C indicates aberration at the C-line, and F indicates aberration at the F-line. No indication means aberration at the d-line. In graphs showing astigmatism, the solid line indicates a sagittal image surface, and the broken line indicates a meridional image surface. The reference symbols of this example are the same for graphs showing various aberrations in each example to be described later.

As each graph showing aberrations in FIG. 2 clarifies, various aberrations are corrected satisfactorily, demonstrating that the optical system WL1 according to Example 1 has excellent image forming performance.

(Example 2)

Figure 3:
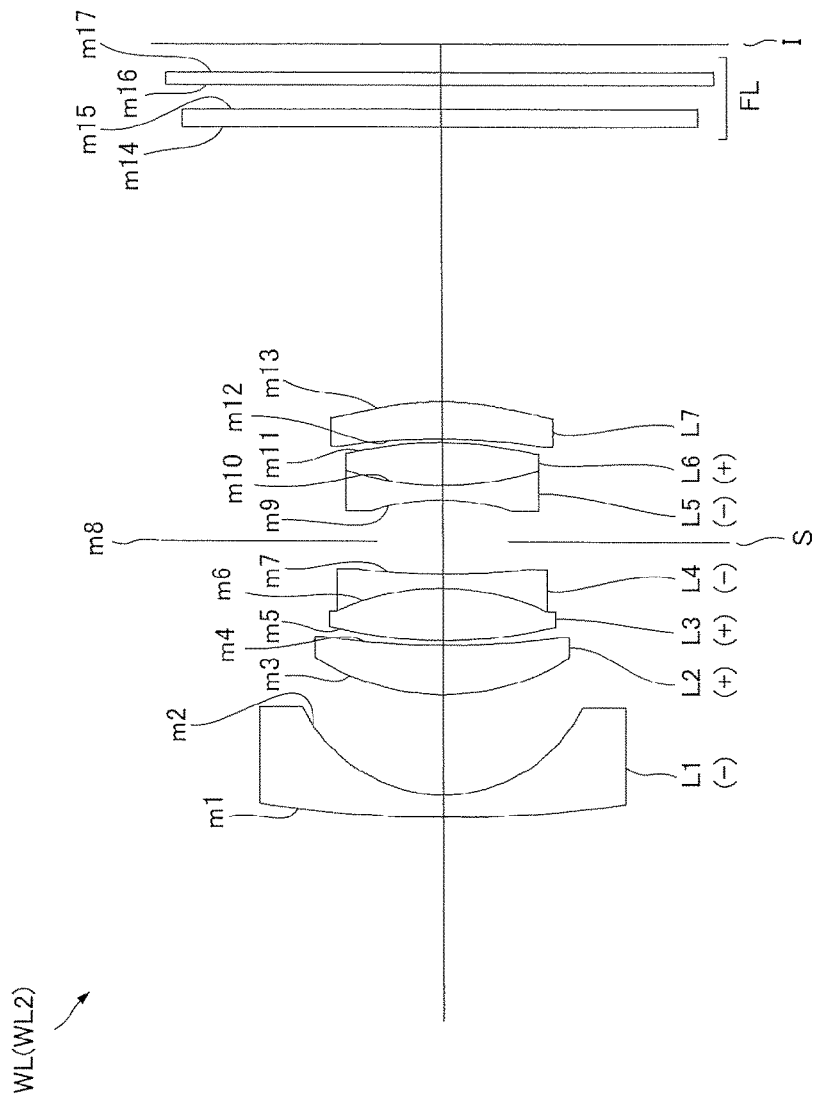
FIG. 3 is a cross-sectional view depicting a configuration of an optical system according to Example 2.

Example 2 will be described with reference to FIG. 3, FIG. 4 and Table 2. As illustrated in FIG. 3, an optical system WL (WL2) according to Example 2 is a wide angle single focus lens, and has, in order from an object, a first lens L1 which is a negative meniscus lens having a convex surface facing the object, a second lens L2 which is a positive meniscus lens having a convex surface facing the object, a cemented lens of a third lens L3 which is a biconvex positive lens and a fourth lens L4 which is a biconcave negative lens, an aperture stop S, a cemented lens of a fifth lens L5 which is a biconcave negative lens and a sixth lens L6 which is a biconvex positive lens, a seventh lens L7 which is a positive meniscus lens having a convex surface facing the image, and a filter group FL. The image side lens surface of the seventh lens L7 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 2 shows each data value of Example 2. The surface numbers 1 to 17 in Table 2 correspond to each optical surface of m1 to m17 shown in FIG. 3 respectively. In Example 2, surface 13 is aspherical.

TABLE 2

[Lens Data]

| Surface number | R | D | nd | vd |
|---|---|---|---|---|
| Object surface | ∞ | | | |
| 1 | 3.9066 | 0.0649 | 1.51823 | 58.82 |
| 2 | 0.4620 | 0.2947 | | |
| 3 | 0.7074 | 0.1433 | 1.69680 | 55.52 |
| 4 | 2.5953 | 0.0135 | | |
| 5 | 1.3629 | 0.1541 | 1.81600 | 46.59 |
| 6 | −0.7481 | 0.0433 | 1.57501 | 41.51 |
| 7 | 2.1228 | 0.0973 | | |
| 8 (Stop S) | ∞ | 0.1190 | | |
| 9 | −0.7083 | 0.0433 | 1.72825 | 28.38 |
| 10 | 0.9639 | 0.1244 | 1.81600 | 46.59 |
| 11 | −1.2224 | 0.0108 | | |
| 12 | −2.0546 | 0.1081 | 1.77377 | 47.18 |
| *13 (Aspherical) | −0.8955 | 0.8000 | | |
| 14 | ∞ | 0.0508 | 1.51680 | 64.20 |
| 15 | ∞ | 0.0703 | | |
| 16 | ∞ | 0.0378 | 1.51680 | 64.20 |
| 17 | ∞ | 0.0822 | | |
| Image plane | ∞ | | | |

[Aspherical Data]
Surface 13

κ = 1.0000, A4 = 8.04902E−01, A6 = 2.78398E+00, A8 = 5.02025E+00, A10 = 0.00000E+00

[Various Data]

| f | 1.00 |
|---|---|
| Fno | 2.88 |
| ω | 38.66 |
| Y | 0.78 |
| BF | 1.011 |
| TL | 2.26 |

[Conditional Expressions]

Conditional expression (1) L3R1/f3 = 2.227
Conditional expression (2) n3 − n4 = 0.241
Conditional expression (3) Σd/f = 1.217

As Table 2 shows, the optical system WL2 of Example 2 satisfies the conditional expressions (1) to (3).

Figure 4:
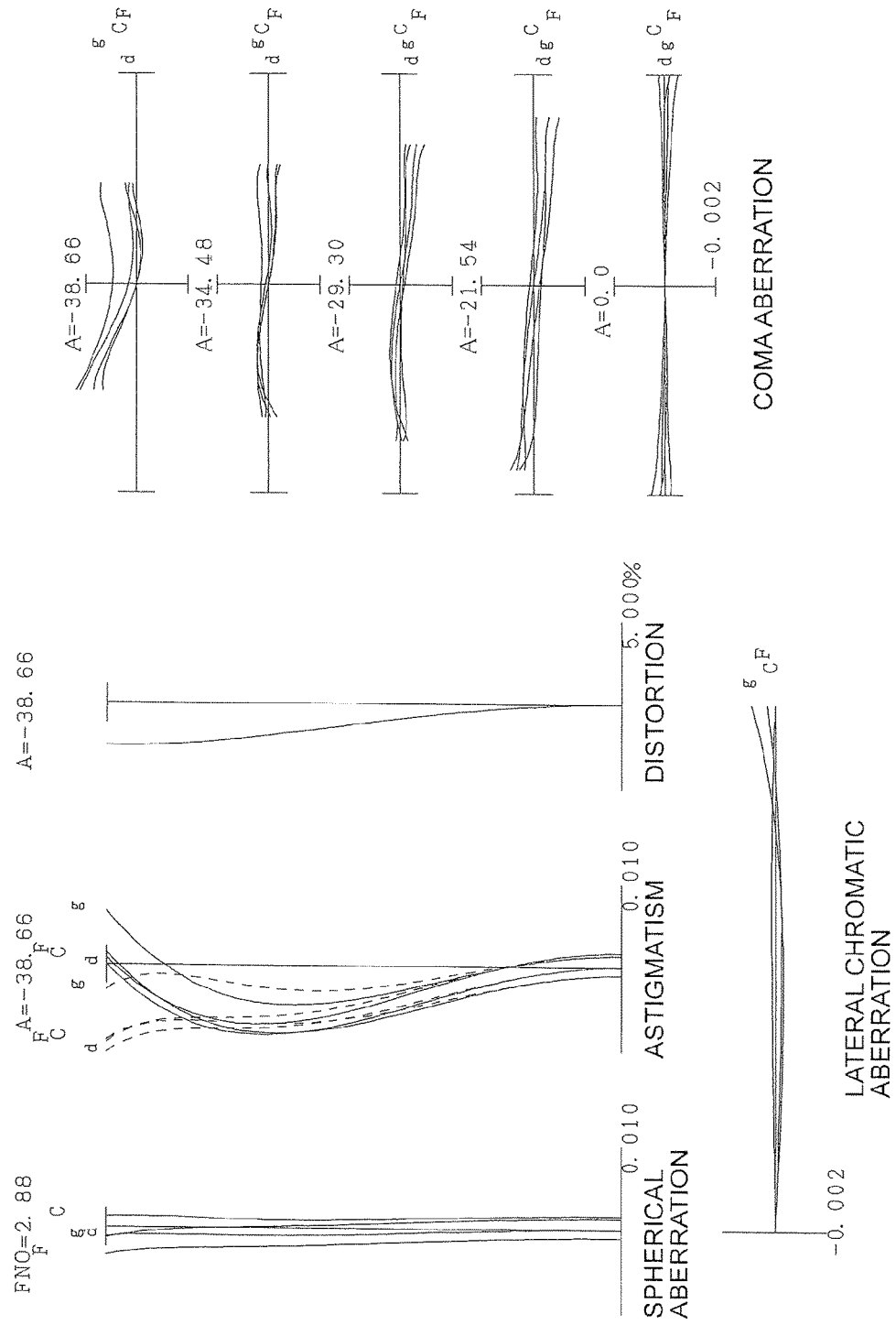
FIG. 4 are graphs showing various aberrations of the optical system according to Example 2 upon focusing on infinity.

FIG. 4 are graphs showing various aberrations (spherical aberration, astigmatism, distortion, coma aberration and lateral chromatic aberration) of the optical system WL2 according to Example 2 upon focusing on infinity. As each graph showing aberrations in FIG. 4 clarifies, various aberrations are corrected satisfactorily, demonstrating that the optical system WL2 according to Example 2 has excellent image forming performance.

(Example 3)

Figure 5:
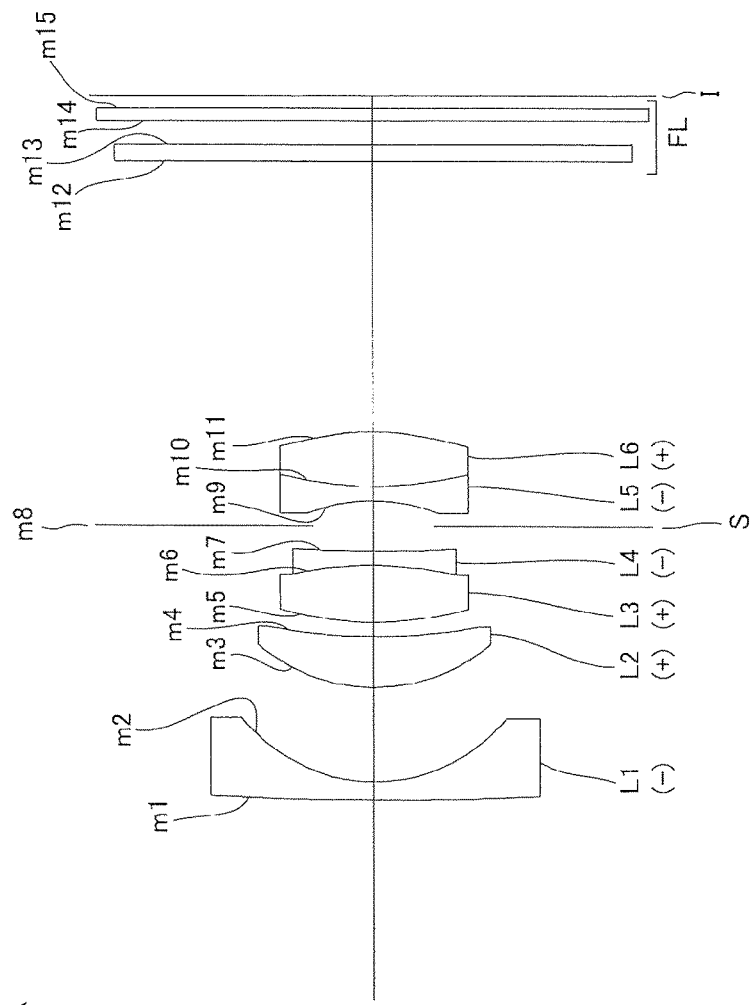
FIG. 5 is a cross-sectional view depicting a configuration of an optical system according to Example 3.

Example 3 will be described with reference to FIG. 5, FIG. 6 and Table 3. As illustrated in FIG. 5, an optical system WL (WL3) according to Example 3 is a wide angle single focus lens, and has, in order from an object, a first lens L1 which is a negative meniscus lens having a convex surface facing the object, a second lens L2 which is a positive meniscus lens having a convex surface facing the object, a cemented lens of a third lens L3 which is a biconvex positive lens and a fourth lens L4 which is a biconcave negative lens, an aperture stop S, a cemented lens of a fifth lens L5 which is a biconcave negative lens and a sixth lens L6 which is a biconvex positive lens, and a filter group FL. The image side lens surface of the sixth lens L6 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 3 shows each data value of Example 3. The surface numbers 1 to 15 in Table 3 correspond to each optical surface of m1 to m15 shown in FIG. 5 respectively. In Example 3, surface 11 is aspherical.

TABLE 3

[Lens Data]

| Surface number | R | D | nd | vd |
|---|---|---|---|---|
| Object surface | ∞ | | | |
| 1 | 9.7931 | 0.0541 | 1.58913 | 61.22 |
| 2 | 0.5154 | 0.2811 | | |
| 3 | 0.5453 | 0.1514 | 1.72916 | 54.61 |
| 4 | 1.7533 | 0.0432 | | |
| 5 | 1.0662 | 0.1703 | 1.81600 | 46.59 |
| 6 | −1.1441 | 0.0432 | 1.69895 | 30.13 |
| 7 | 5.1348 | 0.0730 | | |
| 8 (Stop S) | ∞ | 0.0757 | | |
| 9 | −0.5394 | 0.0432 | 1.72825 | 28.38 |
| 10 | 1.1332 | 0.1622 | 1.85135 | 40.10 |
| *11 (Aspherical) | −0.7326 | 0.8000 | | |
| 12 | ∞ | 0.0508 | 1.51680 | 64.20 |
| 13 | ∞ | 0.0703 | | |
| 14 | ∞ | 0.0378 | 1.51680 | 64.20 |
| 15 | ∞ | 0.0352 | | |
| Image plane | ∞ | | | |

[Aspherical Data]
Surface 11

κ = 1.0000, A4 = 1.50488E+00, A6 = 6.65086E−01, A10 = −5.28484E+02

[Various Data]

| f | 1.00 |
|---|---|
| Fno | 2.88 |
| ω | 38.66 |
| Y | 0.78 |

TABLE 3-continued

| BF | 0.964 |
|---|---|
| TL | 2.09 |

[Conditional Expressions]

Conditional expression (1) L3R1/f3 = 1.522
Conditional expression (2) n3 − n4 = 0.117
Conditional expression (3) Σd/f = 1.097

As Table 3 shows, the optical system WL3 of Example 3 satisfies the conditional expressions (1) to (3).

Figure 6:
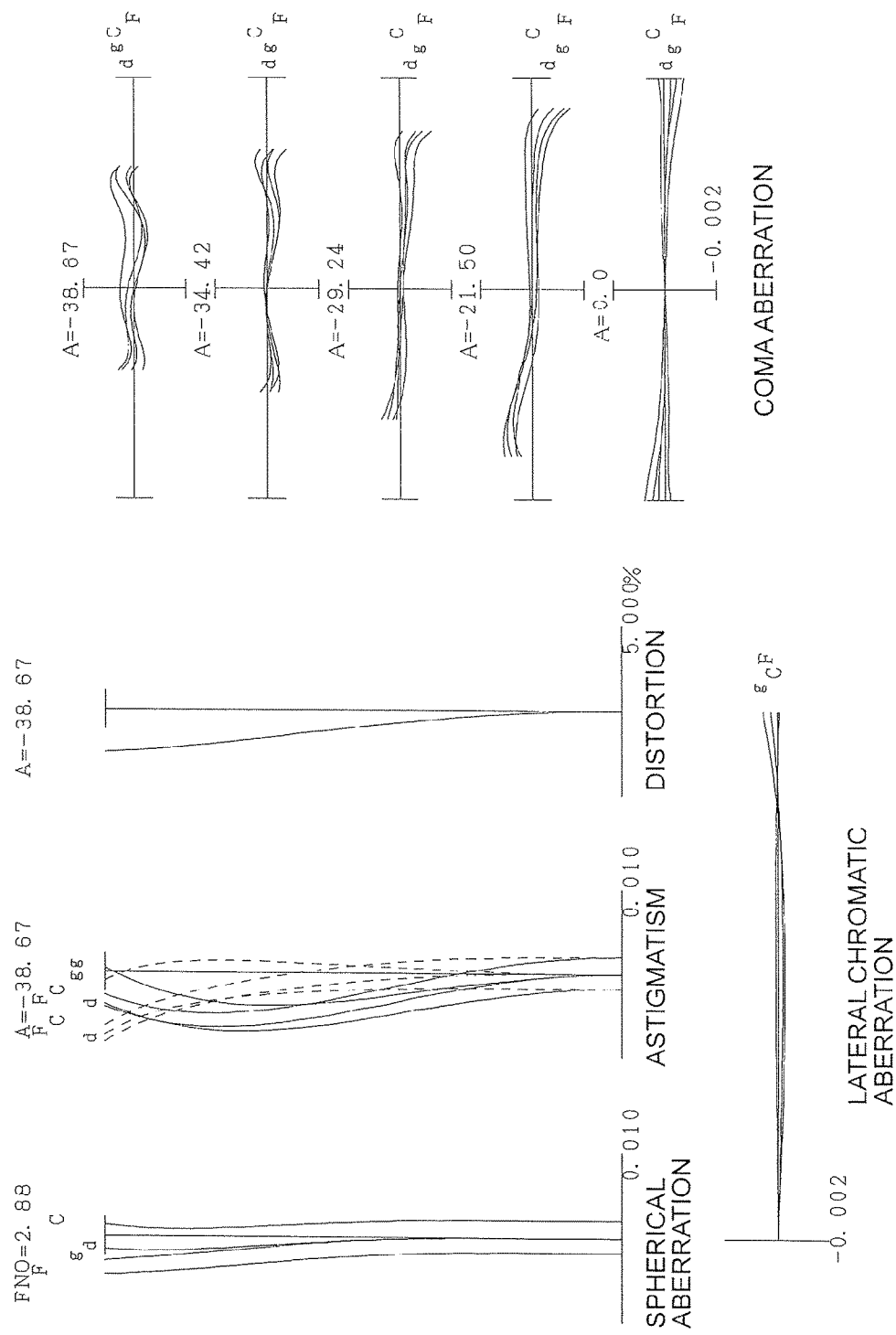
FIG. 6 are graphs showing various aberrations of the optical system according to Example 3 upon focusing on infinity.

FIG. 6 are graphs showing various aberrations (spherical aberration, astigmatism, distortion, coma aberration and lateral Chromatic aberration) of the optical system WL3 according to Example 3 upon focusing on infinity. As each graph showing aberrations in FIG. 6 clarifies, various aberrations are corrected satisfactorily, demonstrating that the optical system WL3 according to Example 3 has excellent image forming performance.

(Example 4)

Figure 7:
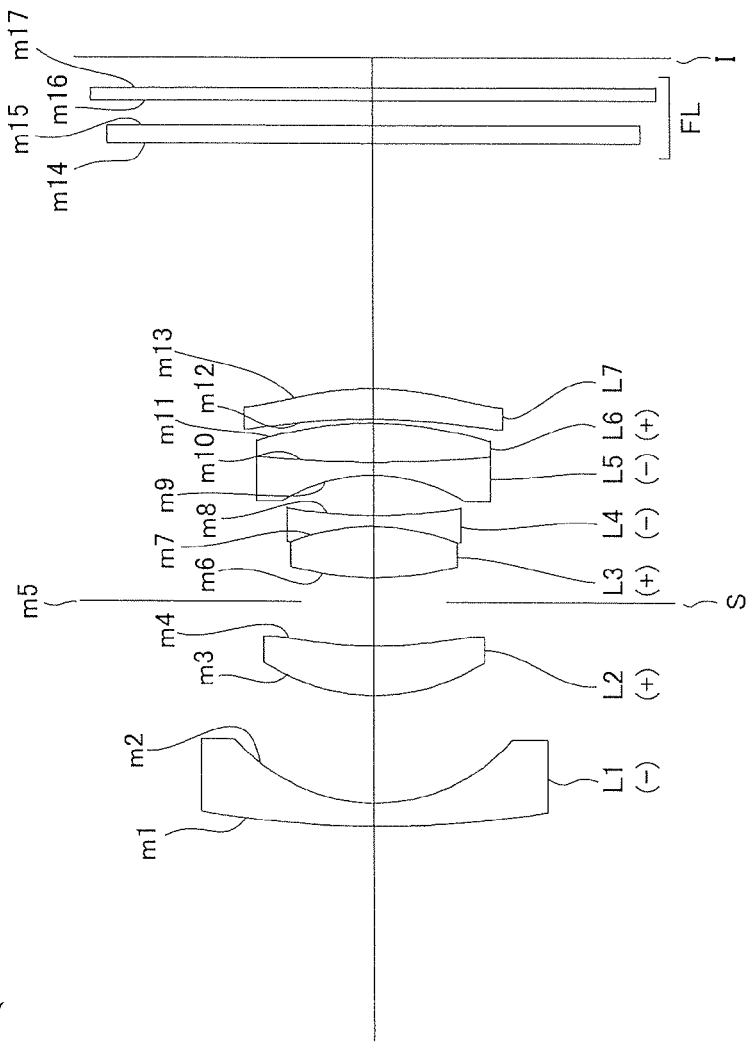
FIG. 7 is a cross-sectional view depicting a configuration of an optical system according to Example 4.

Example 4 will be described with reference to FIG. 7, FIG. 8 and Table 4. As illustrated in FIG. 7, an optical system WL (WL4) according to Example 4 is a wide angle single focus lens, and has, in order from an object, a first lens L1 which is a negative meniscus lens having a convex surface facing the object, a second lens L2 which is a positive meniscus lens having a convex surface facing the object, an aperture stop S, a cemented lens of a third lens L3 which is a biconvex positive lens and a fourth lens L4 which is a biconcave negative lens, a cemented lens of a fifth lens L5 which is a biconcave negative lens and a sixth lens L6 which is a biconvex positive lens, a seventh lens L7 which is a positive meniscus lens having a convex surface facing the image, and a filter group FL. The image side lens surface of the seventh lens L7 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 4 shows each data value of Example 4. The surface numbers 1 to 17 in Table 4 correspond to each optical surface of m1 to m17 shown in FIG. 7 respectively. In Example 4, surface 13 is aspherical.

TABLE 4

[Lens Data]

| Surface number | R | D | nd | vd |
|---|---|---|---|---|
| Object surface | ∞ | | | |
| 1 | 3.0665 | 0.0654 | 1.57957 | 53.74 |
| 2 | 0.5371 | 0.3105 | | |
| 3 | 0.5980 | 0.1416 | 1.77250 | 49.62 |
| 4 | 1.5414 | 0.1253 | | |
| 5 (Stop S) | ∞ | 0.0681 | | |
| 6 | 0.9150 | 0.1471 | 1.88300 | 40.66 |
| 7 | −0.6641 | 0.0327 | 1.69895 | 30.13 |
| 8 | 1.5944 | 0.1144 | | |
| 9 | −0.5149 | 0.0381 | 1.69895 | 30.13 |
| 10 | 3.9176 | 0.1117 | 1.75500 | 52.34 |
| 11 | −1.1230 | 0.0109 | | |
| 12 | −2.1786 | 0.0871 | 1.79050 | 44.98 |
| *13 (Aspherical) | −0.8813 | 0.7000 | | |
| 14 | ∞ | 0.0512 | 1.51680 | 64.20 |
| 15 | ∞ | 0.0708 | | |

TABLE 4-continued

| 16 | ∞ | 0.0381 | 1.51680 | 64.20 |
|---|---|---|---|---|
| 17 | ∞ | 0.0827 | | |
| Image plane | ∞ | | | |

[Aspherical Data]
Surface 13

κ = 1.0000, A4 = 9.95666E−01, A6 = 3.42618E+00, A8 = 5.07167E+00, A10 = −2.10737E+01

[Various Data]

| f | 1.00 |
|---|---|
| Fno | 2.87 |
| ω | 38.88 |
| Y | 0.79 |
| BF | 0.912 |
| TL | 2.20 |

[Conditional Expressions]

Conditional expression (1) L3R1/f3 = 2.008
Conditional expression (2) n3 − n4 = 0.184
Conditional expression (3) Σd/f = 1.253

As Table 4 shows, the optical system WL4 of Example 4 satisfies the conditional expressions (1) to (3).

Figure 8:
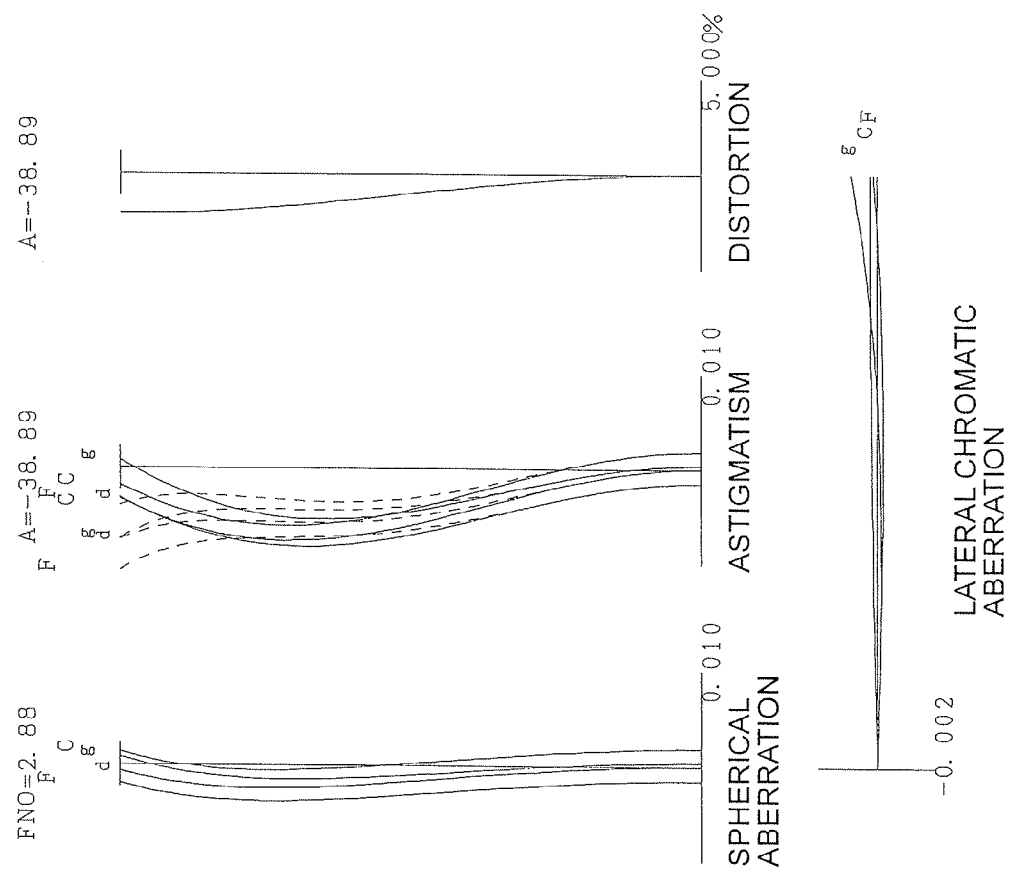
FIG. 8 are graphs showing various aberrations of the optical system according to Example 4 upon focusing on infinity.

FIG. 8 are graphs showing various aberrations (spherical aberration, astigmatism, distortion, coma aberration and lateral chromatic aberration) of the optical system WL4 according to Example 4 upon focusing on infinity. As each graph showing aberrations in FIG. 8 clarifies, various aberrations are corrected satisfactorily, demonstrating that the optical system WL4 according to Example 4 has excellent image forming performance.

(Example 5)

Figure 9:
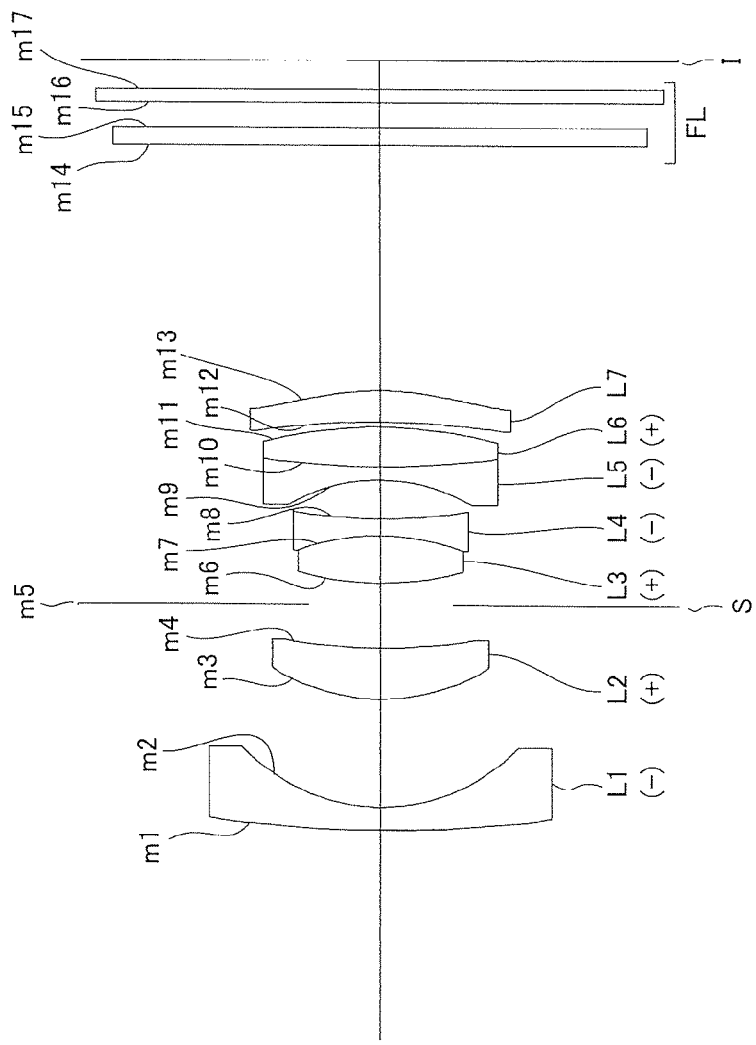
FIG. 9 is a cross-sectional view depicting a configuration of an optical system according to Example 5.

Example 5 will be described with reference to FIG. 9, FIG. 10 and Table 5. As illustrated in FIG. 9, an optical system WL (WL5) according to Example 5 is a wide angle single focus lens, and has, in order from an object, a first lens L1 which is a negative meniscus lens having a convex surface facing the object, a second lens L2 which is a positive meniscus lens having a convex surface facing the Object, an aperture stop S, a cemented lens of a third lens L3 which is a biconvex positive lens and a fourth lens L4 which is a biconcave negative lens, a cemented lens of a fifth lens L5 which is a biconcave negative lens and a sixth lens L6 which is a biconvex positive lens, a seventh lens L7 which is a positive meniscus lens having a convex surface facing the image, and a filter group FL. The image side lens surface of the seventh lens L7 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 5 shows each data value of Example 5. The surface numbers 1 to 17 in Table 5 correspond to each optical surface of m1 to m17 shown in FIG. 9 respectively. In Example 5, surface 13 is aspherical.

TABLE 5

[Lens Data]

| Surface number | R | D | nd | vd |
|---|---|---|---|---|
| Object surface | ∞ | | | |
| 1 | 3.6259 | 0.0654 | 1.57957 | 53.74 |
| 2 | 0.5493 | 0.3104 | | |
| 3 | 0.6062 | 0.1443 | 1.77250 | 49.62 |

TABLE 5-continued

| 4 | 1.5848 | 0.1253 | | |
|---|---|---|---|---|
| 5 | ∞ | 0.0599 | | |
| (Stop S) | | | | |
| 6 | 0.9040 | 0.1361 | 1.88300 | 40.66 |
| 7 | −0.7166 | 0.0490 | 1.69895 | 30.13 |
| 8 | 1.5976 | 0.1116 | | |
| 9 | −0.5352 | 0.0381 | 1.69895 | 30.13 |
| 10 | 2.4515 | 0.1144 | 1.75500 | 52.34 |
| 11 | −1.3426 | 0.0136 | | |
| 12 | −2.5596 | 0.0899 | 1.79050 | 44.98 |
| *13 (Aspherical) | −0.8727 | 0.7000 | | |
| 14 | ∞ | 0.0512 | 1.51680 | 64.20 |
| 15 | ∞ | 0.0708 | | |
| 16 | ∞ | 0.0381 | 1.51680 | 64.20 |
| 17 | ∞ | 0.0812 | | |
| Image plane | ∞ | | | |

[Aspherical Data]
Surface 13

κ = 1.0000, A4 = 1.01556E+00, A6 = 3.43270E+00, A8 = 7.30966E+00, A10 = −2.79168E+01

[Various Data]

| f | 1.00 |
|---|---|
| Fno | 2.90 |
| ω | 38.89 |
| Y | 0.79 |
| BF | 0.911 |
| TL | 2.20 |

[Conditional Expressions]

Conditional expression (1) L3R1/f3 = 1.918
Conditional expression (2) n3 − n4 = 0.184
Conditional expression (3) Σd/f = 1.258

As Table 5 shows, the optical system WL5 of Example 5 satisfies the conditional expressions (1) to (3).

Figure 10:
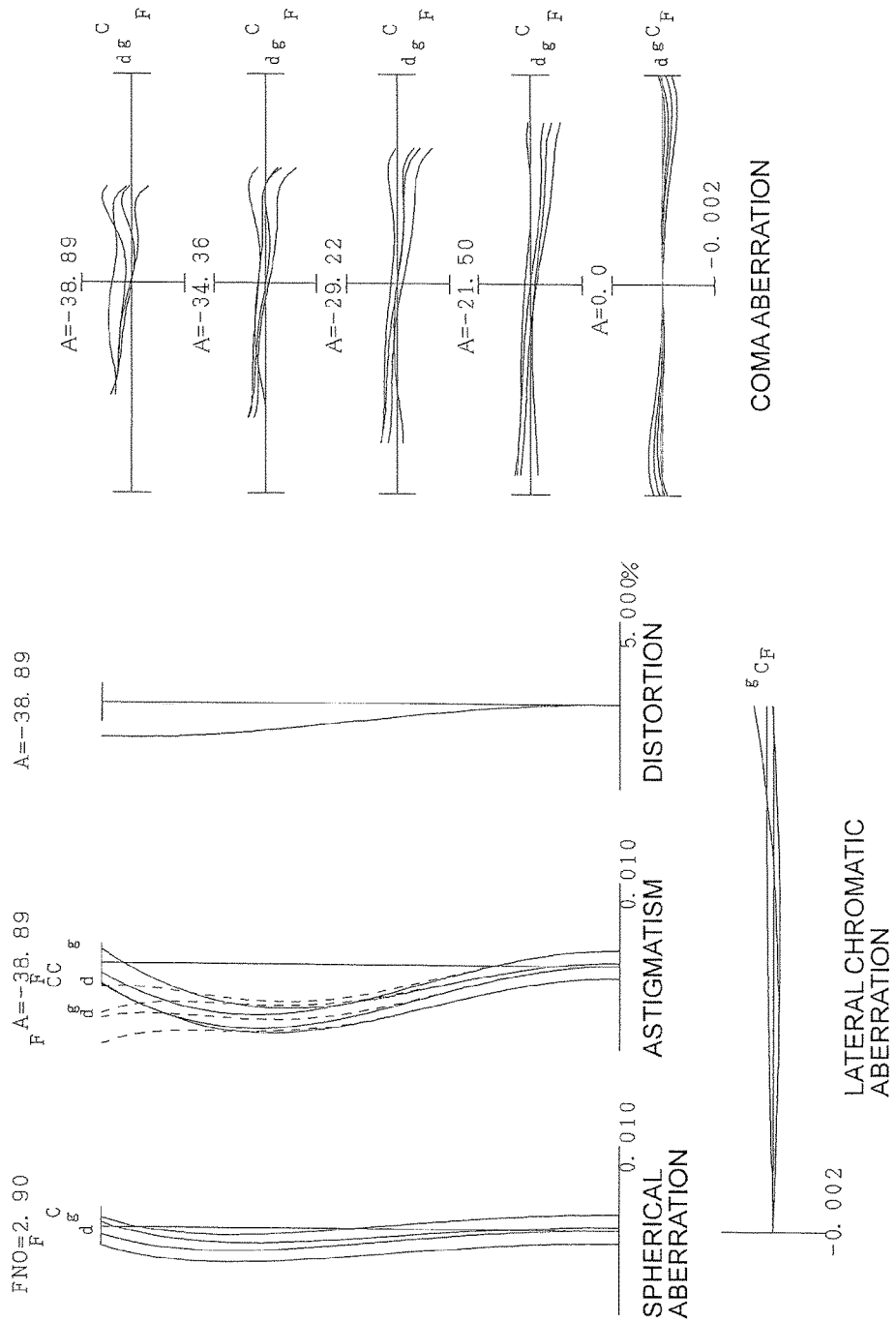
FIG. 10 are graphs showing various aberrations of the optical system according to Example 5 upon focusing on infinity.

FIG. 10 are graphs showing various aberrations (spherical aberration, astigmatism, distortion, coma aberration and lateral chromatic aberration) of the optical system WL5 according to Example 5 upon focusing on infinity. As each graph showing aberrations in FIG. 10 clarifies, various aberrations are corrected satisfactorily, demonstrating that the optical system WL5 according to Example 5 has excellent image forming performance.

(Example 6)

Figure 11:
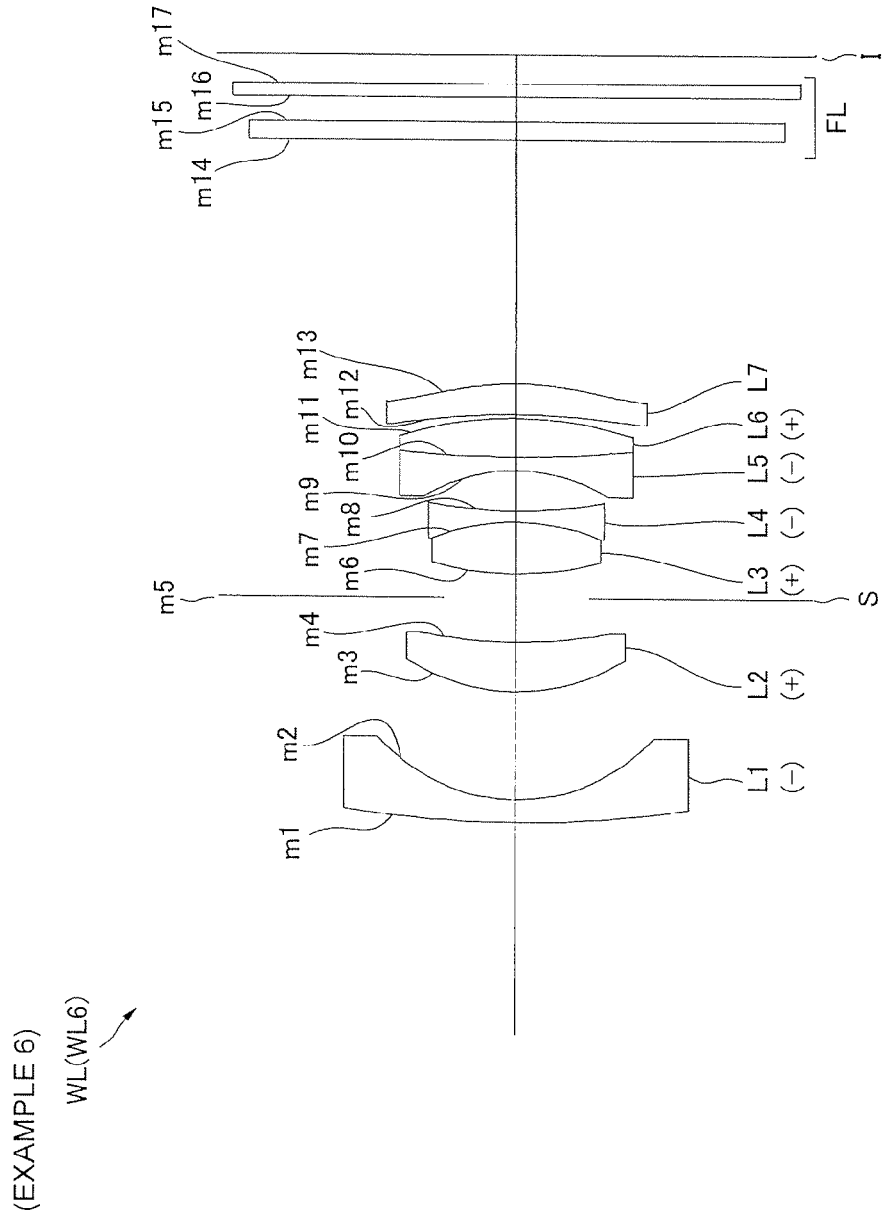
FIG. 11 is a cross-sectional view depicting a configuration of an optical system according to Example 6.

Example 6 will be described with reference to FIG. 11, FIG. 12 and Table 6. As illustrated in FIG. 11, an optical system WL (WL6) according to Example 6 is a wide angle single focus lens, and has, in order from an object, a first lens L1 which is a negative meniscus lens having a convex surface facing the object, a second lens L2 which is a positive meniscus lens having a convex surface facing the Object, an aperture stop S, a cemented lens of a third lens L3 which is a biconvex positive lens and a fourth lens L4 which is a biconcave negative lens, a cemented lens of a fifth lens L5 which is a biconcave negative lens and a sixth lens L6 which is a biconvex positive lens, a seventh lens L7 which is a positive meniscus lens having a convex surface facing the image, and a filter group FL. The image side lens surface of the seventh lens L7 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 6 shows each data value of Example 6. The surface numbers 1 to 17 in Table 6 correspond to each optical surface of m1 to m17 shown in FIG. 11 respectively. In Example 6, surface 13 is aspherical.

TABLE 6

[Lens Data]

| Surface number | R | D | nd | vd |
|---|---|---|---|---|
| Object surface | ∞ | | | |
| 1 | 3.2298 | 0.0654 | 1.57957 | 53.74 |
| 2 | 0.5417 | 0.3105 | | |
| 3 | 0.6004 | 0.1416 | 1.77250 | 49.62 |
| 4 | 1.5414 | 0.1253 | | |
| 5 (Stop S) | ∞ | 0.0681 | | |
| 6 | 0.8973 | 0.1471 | 1.88300 | 40.66 |
| 7 | −0.6787 | 0.0327 | 1.69895 | 30.13 |
| 8 | 1.5571 | 0.1144 | | |
| 9 | −0.5235 | 0.0381 | 1.69895 | 30.13 |
| 10 | 3.3903 | 0.1117 | 1.75500 | 52.34 |
| 11 | −1.1441 | 0.0109 | | |
| 12 | −2.1786 | 0.0871 | 1.79050 | 44.98 |
| *13 (Aspherical) | −0.8906 | 0.7000 | | |
| 14 | ∞ | 0.0512 | 1.51680 | 64.20 |
| 15 | ∞ | 0.0708 | | |
| 16 | ∞ | 0.0381 | 1.51680 | 64.20 |
| 17 | ∞ | 0.0812 | | |
| Image plane | ∞ | | | |

[Aspherical Data]
Surface 13

$\kappa = 1.0000$, $A4 = 1.02354E+00$, $A6 = 3.25403E+00$, $A8 = 7.94663E+00$, $A10 = -3.18141E+01$

[Various Data]

| f | 1.00 |
|---|---|
| Fno | 2.88 |
| ω | 38.87 |
| Y | 0.79 |
| BF | 0.911 |
| TL | 2.19 |

[Conditional Expressions]

Conditional expression (1) L3R1/f3 = 1.961
Conditional expression (2) n3 − n4 = 0.184
Conditional expression (3) Σd/f = 1.253

As Table 6 shows, the optical system WL6 of Example 6 satisfies the conditional expressions (1) to (3).

FIG. 12 are graphs showing various aberrations (spherical aberration, astigmatism, distortion, coma aberration and lateral chromatic aberration) of the optical system WL6 according to Example 6 upon focusing on infinity. As each graph showing aberrations in FIG. 12 clarifies, various aberrations are corrected satisfactorily, demonstrating that the optical system WL6 according to Example 6 has excellent image forming performance.

According to each example described above, an optical system where the lens barrel can be retracted into the camera when the camera is not used, but which still has compactness, brightness (Fno is about 2.8), a wide angel of view (about 76°), and high optical performance with a small number of constituting lenses, can be implemented.

Description of the Embodiments (2)

Embodiment 2 will now be described with reference to the drawings.

Figure 16:
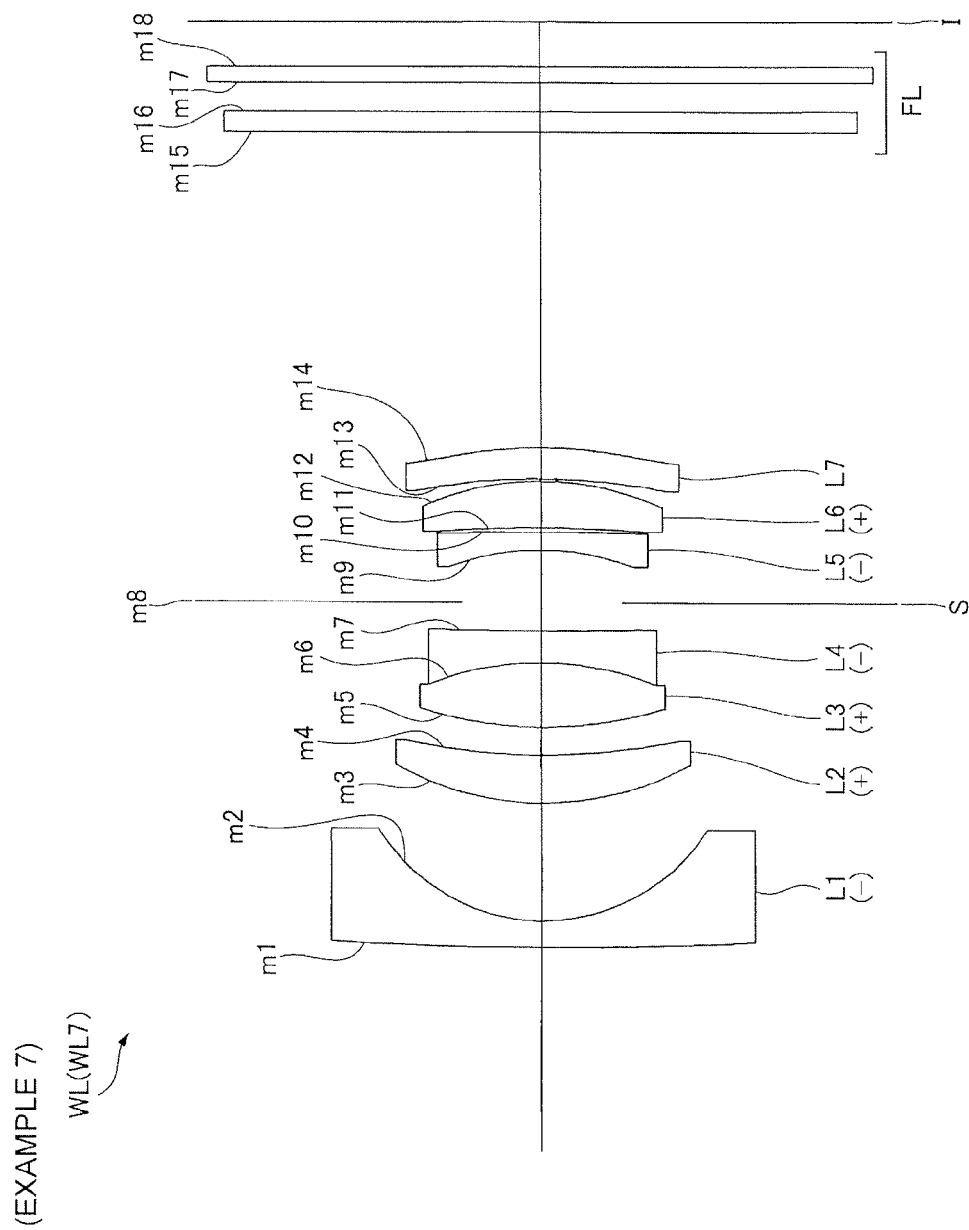
FIG. 16 is a cross-sectional view depicting a configuration of an optical system according to Example 7.

As illustrated in FIG. 16, an optical system WL of Embodiment 2 has, in order from an object, a first lens L1 having negative refractive power, a second lens L2 having positive refractive power, a third lens L3 having positive refractive power, a fourth lens L4 having negative refractive power, a fifth lens L5 having negative refractive power, and a sixth lens L6 having positive refractive power, wherein the following conditional expression (4) is satisfied.

$$0.88 < L4R2/f \quad (4)$$

where L4R2 denotes a radius of curvature of an image side surface of the fourth lens L4, and f denotes a focal length of the total lens system.

In designing an imaging optical system, such as a photograph lens, normally it is difficult to implement a wider angle of view and a larger aperture without increasing the size of the optical system. Further, as the aperture becomes larger, it becomes difficult to achieve both correction of the spherical aberration and correction of the coma aberration and astigmatism. Still further, if the angle of view is widened without increasing the size of the optical system, it becomes difficult to correct spherical aberration, astigmatism and various chromatic aberrations.

According to the optical system WL according to this embodiment that has the above configuration, it is possible to decrease the total thickness of the lens (distance from the front surface of the lenses to the last surface of the lenses) and retract the lens barrel into the camera when the camera is not used, and slimness of the camera is implemented by the thin lens barrel when the camera is not used, therefore compactness, brightness (Fno is About 2.8), a wide angle of view (about 75°) are implemented, and spherical aberration, coma aberration and lateral chromatic aberration can be satisfactorily corrected with a small number of lenses.

Furthermore, the lens group having positive refractive power is disposed on the image side of the first lens L1 having negative refractive power (retro focus type), whereby various aberrations including coma aberration and curvature of field can be controlled, and a wider angle of view can be implemented without affecting compactness.

The conditional expression (4) specifies the ratio of the radius of curvature of the image side surface of the fourth lens L4 and the focal length of the total lens system. In the optical system WL according to this embodiment, spherical aberration and coma aberration can be decreased by satisfying the conditional expression (4). If the lower limit value of the conditional expression (4) is not reached and L4R2 is a positive value, the radius of curvature of the object side surface of the fourth lens L4 becomes too small. As a result, inward coma aberration and distortion can be effectively corrected, but spherical aberration is overcorrected, and correcting this state becomes difficult. If the lower limit value of the conditional expression (4) is not reached and L4R2 is a negative value, the object side surface of the fourth lens L4 has positive refractive power, hence the generation of upper coma aberration and distortion increases, and correcting this state becomes difficult.

To demonstrate the effect of this embodiment with a certainty, it is preferable that the lower limit value of the conditional expression (4) is 0.90. And to demonstrate the effect of this embodiment to the maximum, it is preferable that the lower limit value of the conditional expression (4) is 0.99.

To demonstrate the effect of this embodiment with certainty, it is preferable that the upper limit value of the conditional expression (4) is 8.60.

In the optical system WL according to this embodiment, it is preferable that the following conditional expression (5) is satisfied.

$$-1.450 < (L5R1+L4R2)/(L5R1-L4R2) < -0.310 \quad (5)$$

where L5R1 denotes a radius of curvature of an object side surface of the fifth lens L5.

The conditional expression (5) specifies the shape factor of an air lens that is generated between the image side surface of the fourth lens L4 and the object side surface of the fifth lens L5. By satisfying the conditional expression (5) in the optical system WL of this embodiment, coma aberration and distortion can be satisfactorily corrected, and a flat image plane can be acquired even if the optical system WL is compact. If the lower limit value of the conditional expression (5) is not reached and L4R2 is a negative value, L4R2 generates positive refractive power, hence generation of upper coma aberration and distortion increases, and correcting this state becomes difficult. If the lower limit value of the conditional expression (5) is not reached and L5R1 is a positive value, L5R1 generates positive refractive power, hence generation of distortion increases, and correcting this state becomes difficult. Moreover, the Petzval sum becomes too large, which makes it difficult to acquire a flat image plane. If the upper limit value of the conditional expression (5) is exceeded, the radius of the curvature of the object side surface of the fourth lens L4 becomes too small. As a result, the inward coma aberration and distortion can be effectively corrected, but spherical aberration is overcorrected, and correcting this state becomes difficult.

To demonstrate the effect of this embodiment with certainty, it is preferable that the lower limit value of the conditional expression (5) is −1.200. To demonstrate the effect of this embodiment to the maximum, it is preferable that the lower limit value of the conditional expression (5) is −1.000.

To demonstrate the effect of this embodiment with certainty, it is preferable that the upper limit value of the conditional expression (5) is −0.510.

In the optical system WL according to this embodiment, it is preferable that the following conditional expression (6) is satisfied.

$$L3f/f<0.56 \tag{6}$$

where L3F denotes a focal length of the third lens L3.

The conditional expression (6) specifies the focal length of the third lens L3. By satisfying the conditional expression (6) in the optical system WL of this embodiment, coma aberration and astigmatism can be satisfactorily corrected, and a flat image plane can be acquired even if the optical system WL is compact. If a corresponding value in the conditional expression (6) exceeds the upper limit value, the positive refractive power of the third lens L3 becomes too small. As a result, the total lens system becomes large. In this case, compactness can be implemented if the positive refractive power of the second lens L2 is increased, but the coma aberration and astigmatism generated in the first lens L1 and the second lens L2 become too large, which make it difficult to correct aberration in the total lens system.

To demonstrate the effect of the embodiment with certainty, it is preferable that the upper limit value of the conditional expression (6) is 0.53. And to demonstrate the effect of this embodiment to the maximum, it is preferable that the upper limit value of the conditional expression (6) is 0.49.

In the optical system WL according to this embodiment, it is preferable that the first lens L1 is a negative meniscus lens having a concave surface facing the image. By this configuration, distortion and coma aberration can be satisfactorily corrected.

In the optical system WL according to this embodiment, it is preferable that the image side surface of the lens located closest to the image (image side surface m13 of the seventh lens L7 in the case of FIG. 16) is aspherical. By this configuration, the surface where the abaxial rays pass through the positions distant from the optical axis becomes aspherical, and effective aberration correction becomes possible. If the aspherical surface is configured such that the refractive power progressively weakens in a direction from the optical axis toward the periphery, then curvature of field and astigmatism can be satisfactorily corrected, and aberrations of the total lens system can be satisfactorily corrected.

According to the optical system WL having the above mentioned configuration of this embodiment, an optical system with which the lens barrel can be retracted into the camera when the camera is not used, but which still has compactness, wide angle of view, brightness and high optical performance can be implemented. Furthermore, a slimmer camera can be implemented by minimizing thickness of the lens barrel portion in the retracted state.

Figure 22A:
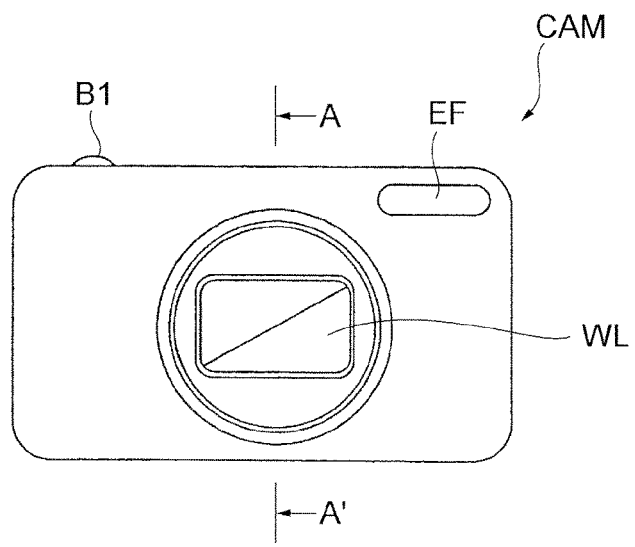
FIG. 22A is a front view and FIG. 22B is a rear view.
Figure 22B:
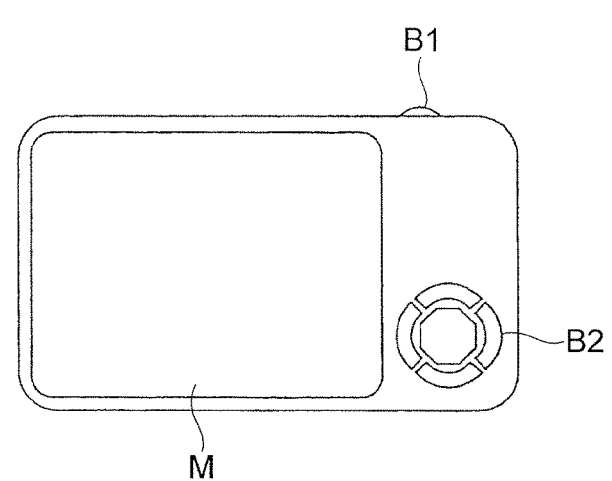
Figure 23:
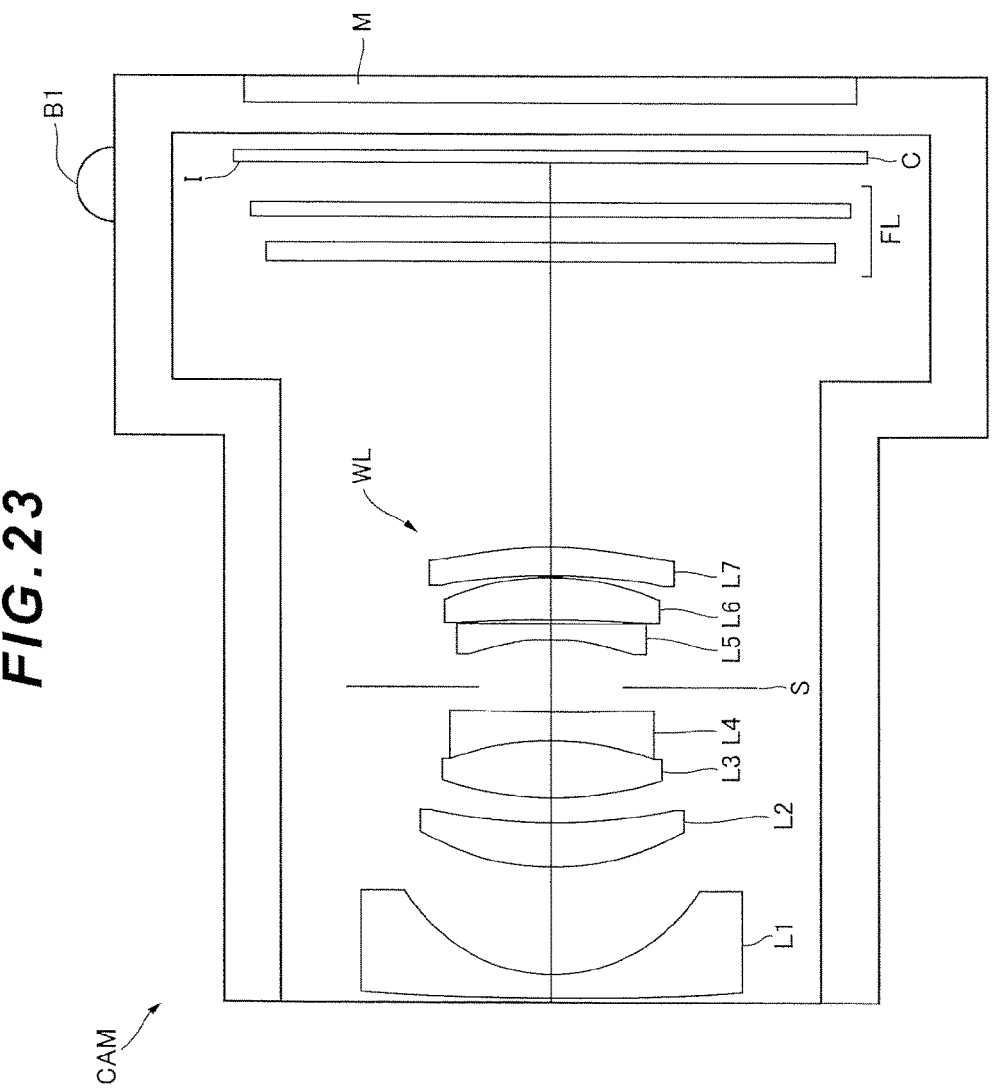
FIG. 23 is a cross-sectional view along the A-A' line in FIG. 22A.

FIG. 22 and FIG. 23 show a configuration of a digital still camera CAM (optical apparatus) as an optical apparatus including the optical system WL described above. In the digital still camera CAM, if a power button (not illustrated) is pressed, a shutter (not illustrated) of the image capturing lens (optical system WL) is opened, and light from an object is collected by the optical system WL and forms an image on a picture element C (e.g. CCD, CMOS) disposed on the image plane I (see FIG. 16). The object image formed on the picture element C is displayed on a liquid crystal monitor M, which is disposed on the rear face of the digital still camera CAM. The user determines a composition while viewing the liquid crystal monitor M, then presses a release button B1 to photograph the object image using the picture element C, and records and stores the image in a memory (not illustrated).

In the camera CAM, an auxiliary light emitting unit EF that emits auxiliary light when an object appears dark, and a function button B2 that is used to set various conditions of the digital still camera CAM are disposed. Here a compact type camera, where the camera CAM and the optical system WL are integrated, is shown as an example, but the optical apparatus may be a single lens reflex camera, where the lens barrel having the optical system WL and the camera body are detachable.

According to the camera CAM having the above configuration, where the optical system WL is included as the image-capturing lens WL, a camera in which the lens barrel can be retracted into the camera when the camera is not used but which still has compactness, wide angle of view, brightness and high optical performance, can be implemented. Furthermore, a slimmer camera can be implemented by minimizing the thickness of the lens barrel portion in the retracted state.

Figure 24:
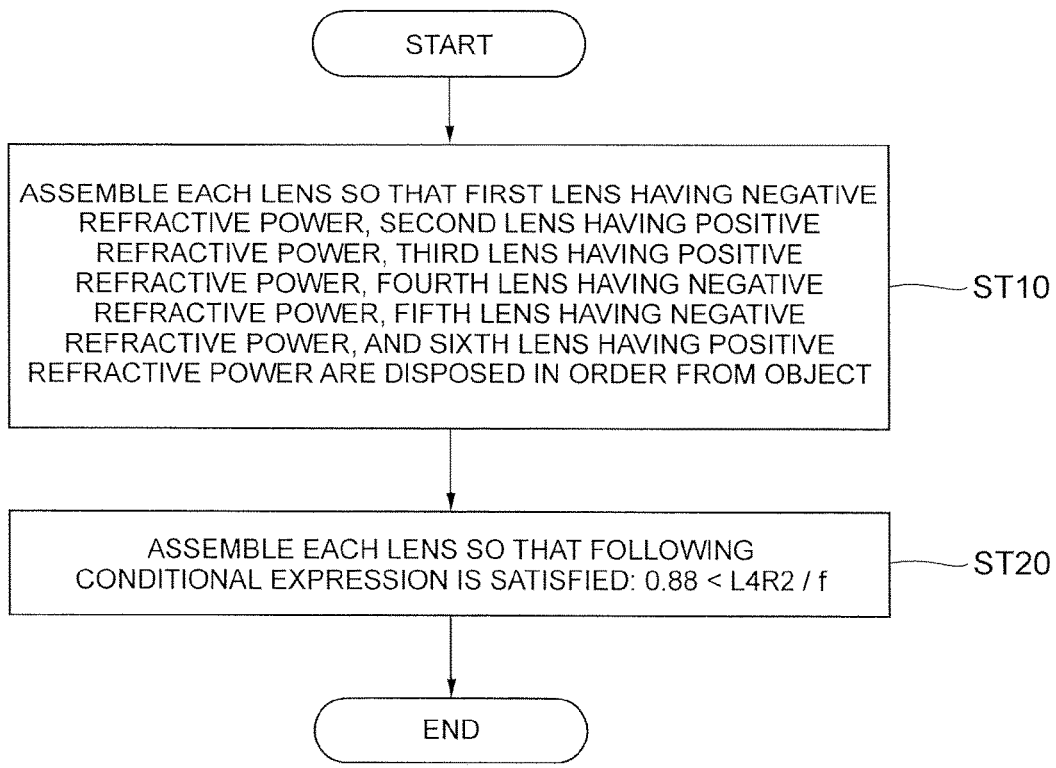
FIG. 24 is a flow chart depicting a method for manufacturing the optical system according to this embodiment represented by Examples 7 to 9.

Now a method for manufacturing the optical system WL will be described with reference to FIG. 24. First each lens is assembled so that in the lens barrel the first lens L1 having negative refractive power, the second lens L2 having positive refractive power, the third lens L3 having positive refractive power, the fourth lens L4 having negative refractive power, the fifth lens L5 having negative refractive power, and the sixth lens L6 having positive refractive power are disposed in order from the object (step ST10). In this step, each lens is assembled so that the following conditional expression (4) is satisfied (step ST20).

$$0.88<L4R2/f \tag{4}$$

where L4R2 denotes a radius of curvature of an image side surface of the fourth lens L4, and f denotes a focal length of the total lens system.

As an example of the lens configuration according to this embodiment, as illustrated in the optical system WL in FIG. 16, each member is assembled in the lens barrel so that a negative meniscus lens having a convex surface facing the object as the first lens L1 having negative refractive power, a positive meniscus lens having a convex surface facing the object as the second lens L2 having positive refractive power, a biconvex positive lens as the third lens L3 having positive refractive power, a biconcave negative lens as the fourth lens L4 having negative refractive power, a biconcave negative lens as the fifth lens L5 having negative refractive power, a biconvex positive lens as the sixth lens L6 having positive refractive power, and a biconvex positive lens as the seventh lens L7, are disposed in this order. The biconvex positive lens L3 and the biconcave negative lens L4 are cemented to be a cemented lens. The biconcave negative lens L5 and the biconvex positive lens L6 constitute a cemented lens. The optical system WL satisfies the conditional expression (4) (corresponding value: 0.993).

According to the method for manufacturing the optical system WL of this embodiment, an optical system with which the lens barrel can be retracted into the camera when the camera is not used, but which still has compactness, wide angle of view, brightness and high optical performance can be implemented. Furthermore, an optical system that can contribute to a slimmer camera can be implemented by minimizing thickness of the lens barrel portion in the retracted state.

Example (2)

Each example of Embodiment 2 (Example 7 to Example 9) will be described with reference to the drawings.

Each reference symbol in FIG. 16 related to Example 7 is independent from the other examples in order to prevent a complication of descriptions caused by an increase in the number of digits of a reference symbol. Therefore, even if a reference symbol in a drawing for Example 7 is the same as that in a drawing for another example, this does not necessarily mean that composing elements in these examples are the same.

In each example, the aberration characteristics are calculated with respect to the C-line (wavelength: 656.2730 nm), the d-line (wavelength: 587.5620 nm), the F-line (wavelength: 486.1330 nm) and the g-line (wavelength: 435.8350 nm).

Table 7 to Table 9 shown below are tables on each data in Example 7 to Example 9.

In [Conditional Expression], a value corresponding to each conditional expression (4) to (6) is shown.

In all the data values herein below, unless specifically indicated, "mm" is normally used as the unit of focal length f, radius of curvature R, surface distance D and other lengths, but the unit is not limited to "mm", and another appropriate unit may be used since an equivalent optical performance is obtained even if the optical system is proportionally expanded or proportionally reduced.

This description on the table is the same for all examples, and is therefore omitted below.

(Example 7)

Example 7 will be described with reference to FIG. 16, FIG. 17 and Table 7. As illustrated in FIG. 16, an optical system WL (WL7) according to Example 7 is a wide angle single focus lens, and has, in order from an object, a first lens L1 which is a negative meniscus lens having a convex surface facing the object, a second lens L2 which is a positive meniscus lens having a convex surface facing the object, a cemented lens of a third lens L3 which is a biconvex positive lens and a fourth lens L4 which is a biconcave negative lens, an aperture stop S, a fifth lens L5 which is a biconcave negative lens, a sixth lens L6 which is a positive meniscus lens having a convex surface facing the image, a seventh lens L7 which is a positive meniscus lens having a convex surface facing the image, and a filter group FL. The image side lens surface of the seventh lens L7 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the Image plane I.

Table 7 shows each data value of Example 7. The surface numbers 1 to 18 in Table 7 correspond to each optical surface of m1 to m18 shown in FIG. 16 respectively. In Example 7, surface 14 is aspherical.

TABLE 7

[Lens Data]

| Surface number | R | D | nd | νd |
|---|---|---|---|---|
| Object surface | ∞ | | | |
| 1 | 8.9738 | 0.0649 | 1.51823 | 58.82 |
| 2 | 0.4819 | 0.2865 | | |
| 3 | 0.7445 | 0.1189 | 1.72916 | 54.61 |
| 4 | 1.6219 | 0.0676 | | |
| 5 | 1.0084 | 0.1568 | 1.81600 | 46.59 |
| 6 | −0.7623 | 0.0757 | 1.60342 | 38.03 |
| 7 | 8.5872 | 0.0703 | | |
| 8 (Stop S) | ∞ | 0.1270 | | |
| 9 | −0.6482 | 0.0432 | 1.80809 | 22.74 |
| 10 | −11.2813 | 0.0108 | | |
| 11 | −3.7444 | 0.1135 | 1.81600 | 46.59 |
| 12 | −0.7338 | 0.0054 | | |
| 13 | −1.6423 | 0.0757 | 1.80139 | 45.46 |
| *14 (Aspherical) | −1.0658 | 0.9636 | | |
| 15 | ∞ | 0.0508 | 1.51680 | 64.20 |
| 16 | ∞ | 0.0703 | | |
| 17 | ∞ | 0.0378 | 1.51680 | 64.20 |
| 18 | ∞ | 0.1080 | | |
| Imageplane | ∞ | | | |

[Aspherical Data]
Surface 14

κ = 1.0000, A4 = 7.2951E−01, A6 = 3.2482E+00, A8 = 0.0000E+00, A10 = 3.1024E+01

[Various Data]

| f | 1.00 |
|---|---|
| Fno | 2.87 |
| ω | 39.01 |
| Y | 0.790 |
| BF | 0.980 |
| TL | 2.196 |

[Conditional Expressions]

Conditional expression (4) L4R2/f = 8.587
Conditional expression (5) (L5R1 + L4R2)/(L5R1 − L4R2) = −0.860
Conditional expression (6) L3f/f = 0.554

As Table 7 shows, the optical system WL7 of Example 7 satisfies the conditional expressions (4) to (6).

Figure 17:
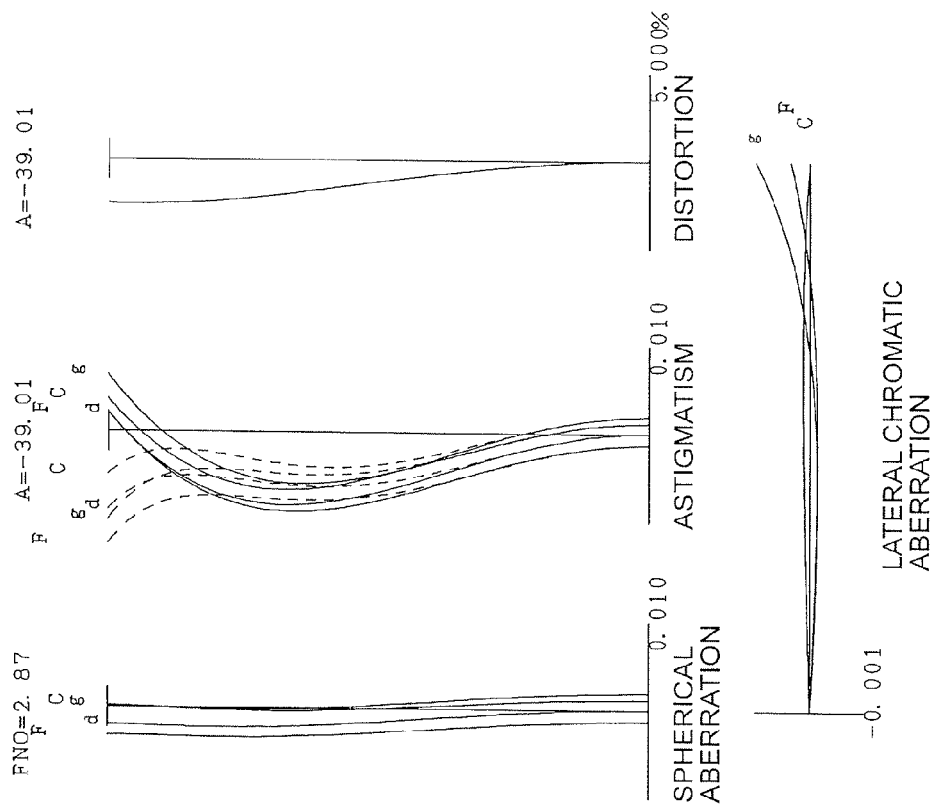
FIG. 17 are graphs showing various aberrations of the optical system according to Example 7 upon focusing on infinity.

FIG. 17 are graphs showing various aberrations (spherical Aberration, astigmatism, distortion, coma aberration and lateral chromatic aberration) of the optical system WL7 according to Example 7 upon focusing on infinity.

In each graph showing aberrations, FNO denotes an F number and A denotes a half angle of view with respect to each image height (unit: °). d indicates aberration at the d-line, g indicates Aberration at the g-line, C indicates aberration at the C-line, and F indicates aberration at the F-line. No indication means aberration at the d-line. In graphs showing astigmatism, the solid line indicates a sagittal image surface, and the broken line indicates a meridional image surface. The reference symbols of this example are the same for graphs showing various aberrations in each example to be described later.

As each graph showing aberrations in FIG. 17 clarifies, various aberrations are corrected satisfactorily, demonstrating that the optical system WL7 according to Example 7 has excellent image forming performance.

(Example 8)

Figure 18:
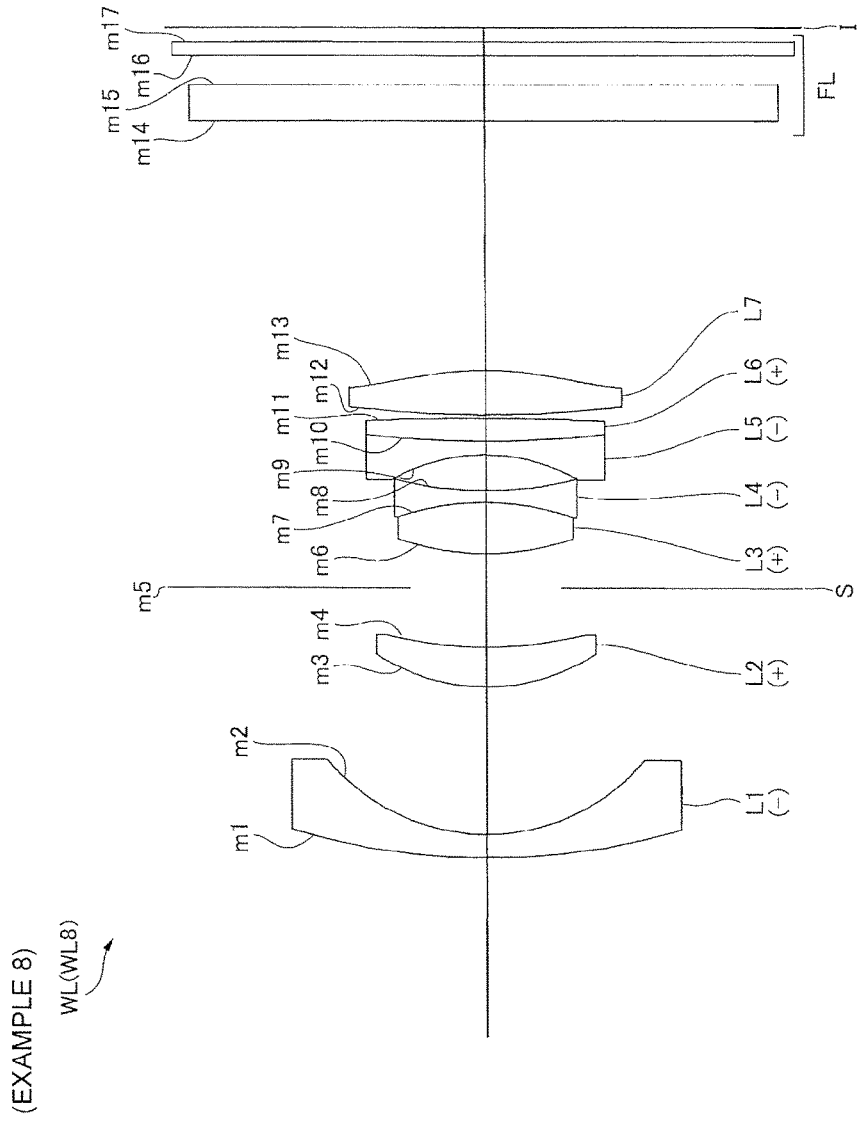
FIG. 18 is a cross-sectional view depicting a configuration of an optical system according to Example 8.

Example 8 will be described with reference to FIG. 18, FIG. 19 and Table 8. As illustrated in FIG. 18, an optical system WL (WL8) according to Example 8 is a wide angle single focus lens, and has, in order from an object, a first lens L1 which is a negative meniscus lens having a convex surface facing the object, a second lens L2 which is a positive meniscus lens having a convex surface facing the object, an aperture stop S, a cemented lens of a third lens L3 which is a biconvex positive lens and a fourth lens L4 which is a biconcave negative lens, a cemented lens of a fifth lens L5 which is a biconcave negative lens and a sixth lens L6 which is a biconvex positive lens, a seventh lens L7 which is a biconvex positive lens, and a filter group FL. The image side of the seventh lens L7 is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 8 shows each data value of Example 8. The surface numbers 1 to 17 in Table 8 correspond to each optical surface of m1 to m17 shown in FIG. 18 respectively. In Example 8, surface 13 is aspherical.

TABLE 8

[Lens Data]

| Surface number | R | D | nd | νd |
|---|---|---|---|---|
| Object surface | ∞ | | | |
| 1 | 1.9223 | 0.0632 | 1.57957 | 53.74 |
| 2 | 0.5749 | 0.3992 | | |
| 3 | 0.5513 | 0.1062 | 1.77250 | 49.62 |
| 4 | 1.0806 | 0.1583 | | |
| 5 | ∞ | 0.0928 | | |
| (Stop S) | | | | |
| 6 | 0.7481 | 0.1367 | 1.88300 | 40.66 |
| 7 | −0.7562 | 0.0316 | 1.69895 | 30.13 |
| 8 | 0.9931 | 0.0974 | | |
| 9 | −0.5135 | 0.0368 | 1.69895 | 30.13 |
| 10 | 3.0398 | 0.0635 | 1.75500 | 52.33 |
| 11 | −7.5617 | 0.0105 | | |
| 12 | 3.3409 | 0.1196 | 1.79050 | 45.01 |
| *13 | −0.8993 | 0.6750 | | |
| (Aspherical) | | | | |
| 14 | ∞ | 0.0963 | 1.51680 | 64.20 |
| 15 | ∞ | 0.0774 | | |
| 16 | ∞ | 0.0368 | 1.51680 | 64.20 |
| 17 | ∞ | 0.0380 | | |
| Image plane | ∞ | | | |

TABLE 8-continued

[Aspherical Data]
Surface 13

κ = 1.0000, A4 = 1.3016E+00, A6 = 3.4411E+00, A8 = 2.7592E+00, A10 = −4.1017E+01

[Various Data]

| f | 1.00 |
|---|---|
| Fno | 2.88 |
| ω | 38.87 |
| Y | 0.790 |
| BF | 0.853 |
| TL | 2.169 |

[Conditional Expressions]

Conditional expression (4) L4R2/f = 0.993
Conditional expression (5) (L5R1 + L4R2)/(L5R1 − L4R2) = −0.318
Conditional expression (6) L3f/f = 0.445

As Table 8 shows, the optical system WL8 of Example 8 satisfies the conditional expressions (4) to (6).

Figure 19:
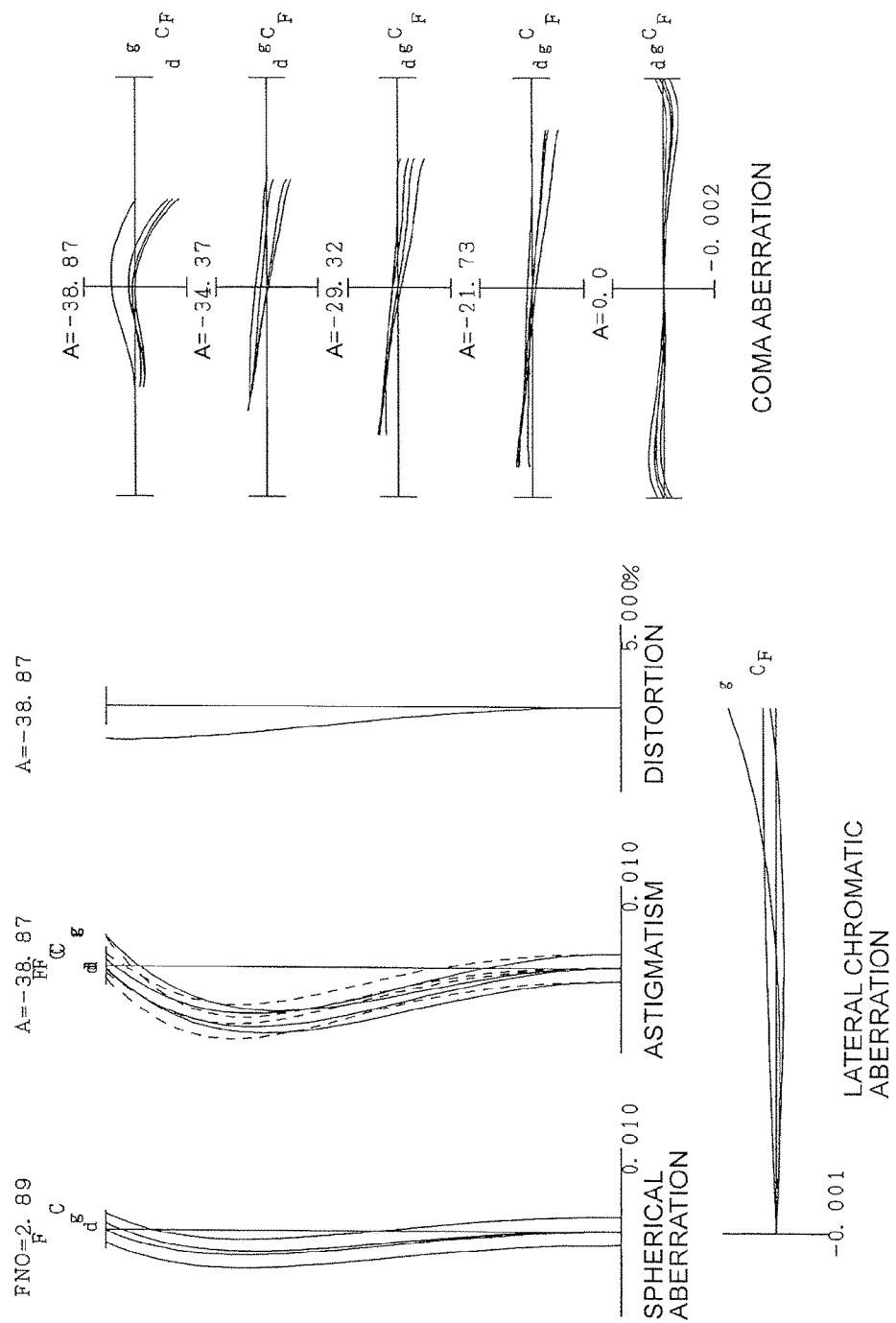
FIG. 19 are graphs showing various aberrations of the optical system according to Example 8 upon focusing on infinity.

FIG. 19 are graphs showing various aberrations (spherical aberration, astigmatism, distortion, coma aberration and lateral chromatic aberration) of the optical system WL8 according to Example 8 upon focusing on infinity. As each graph showing aberrations in FIG. 19 clarifies, various aberrations are corrected satisfactorily, demonstrating that the optical system WL8 according to Example 8 has excellent image forming performance.

(Example 9)

Figure 20:
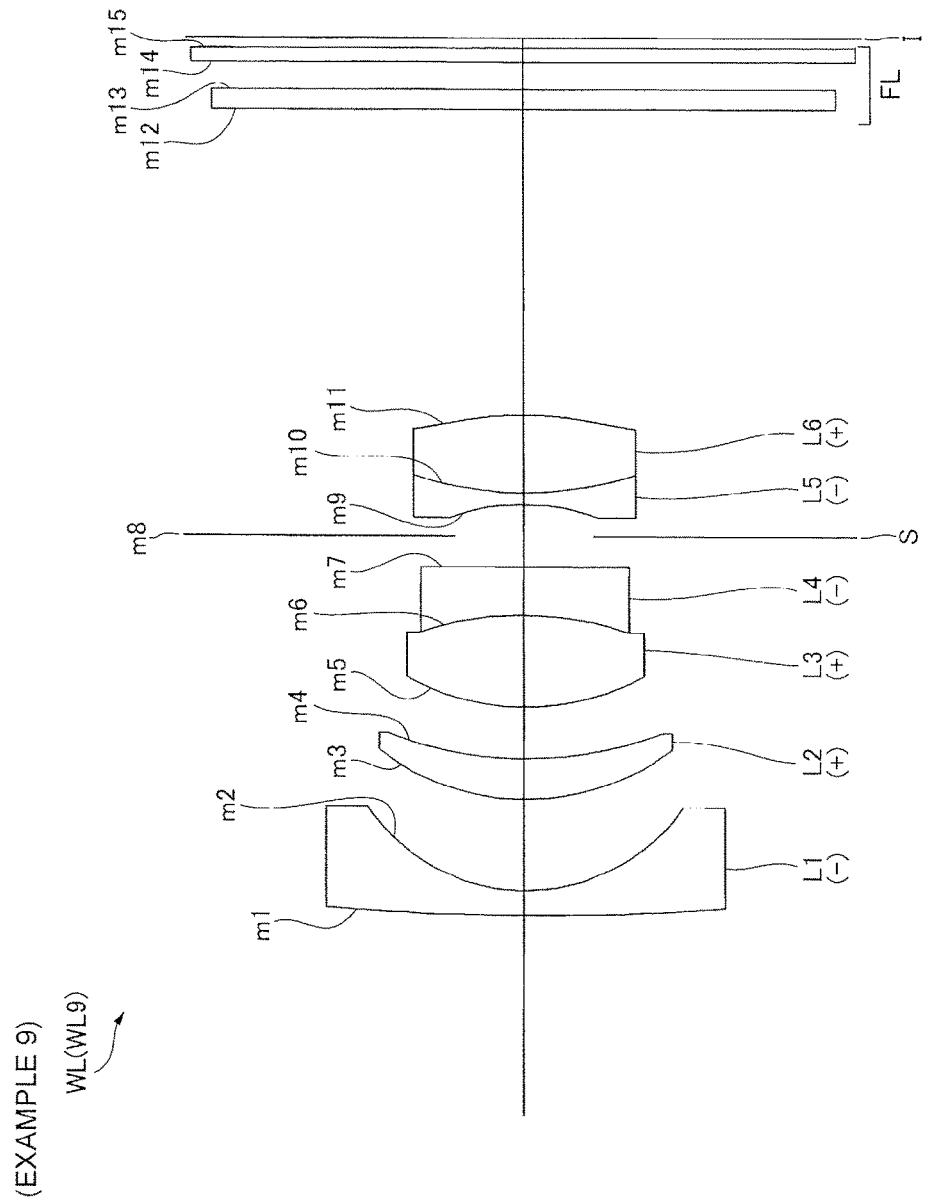
FIG. 20 is a cross-sectional view depicting a configuration of an optical system according to Example 9.

Example 9 will be described with reference to FIG. 20, FIG. 21 and Table 9. As illustrated in FIG. 20, an optical system WL (WL9) according to Example 9 is a wide angle single focus lens, and has, in order from an object, a first lens L1 which is a negative meniscus lens having a convex surface facing the object, a second lens L2 which is a positive meniscus lens having a convex surface facing the object, a cemented lens of a third lens L3 which is a biconvex positive lens and a fourth lens L4 which is a biconcave negative lens, an aperture stop S, a cemented lens of a fifth lens L5 which is a biconcave negative lens and a sixth lens L6 which is a biconvex positive lens, and a filter group FL. The image side surface of the sixth lens L6 which is a positive lens is aspherical. The filter group FL is constituted by a low-pass filter, an infrared cut-off filter or the like, in order to cut off the spatial frequency exceeding the critical resolution of the solid-state picture element (e.g. CCD, CMOS) disposed on the image plane I.

Table 9 shows each data value of Example 9. The surface numbers 1 to 15 in Table 9 correspond to each optical surface of m1 to m15 shown in FIG. 20 respectively. In Example 9, surface 11 is aspherical.

TABLE 9

[Lens Data]

| Surface number | R | D | nd | νd |
|---|---|---|---|---|
| Object surface | ∞ | | | |
| 1 | 6.8460 | 0.0630 | 1.60311 | 60.69 |
| 2 | 0.4999 | 0.2280 | | |
| 3 | 0.6265 | 0.1025 | 1.64000 | 60.19 |
| 4 | 0.9751 | 0.1318 | | |
| 5 | 0.6503 | 0.2300 | 1.81600 | 46.59 |
| 6 | −0.8635 | 0.1207 | 1.69895 | 30.13 |
| 7 | 107.1331 | 0.0786 | | |
| 8 | ∞ | 0.0788 | | |

TABLE 9-continued

| (Stop S) | | | | |
|---|---|---|---|---|
| 9 | −0.5702 | 0.0309 | 1.72825 | 28.38 |
| 10 | 0.9539 | 0.1952 | 1.85135 | 40.10 |
| *11 | −0.8707 | 0.8336 | | |
| (Aspherical) | | | | |
| 12 | ∞ | 0.0493 | 1.51680 | 64.20 |
| 13 | ∞ | 0.0682 | | |
| 14 | ∞ | 0.0367 | 1.51680 | 64.20 |
| 15 | ∞ | 0.0262 | | |
| Image plane | ∞ | | | |

[Aspherical Data]
Surface 11

κ = 1.0000, A4 = 1.3316E+00, A6 = 4.5790E+00, A8 = 1.8336E+01, A10 = −7.1378E+01

[Various Data]

| f | 1.00 |
|---|---|
| Fno | 2.90 |
| ω | 38.66 |
| Y | 0.790 |
| BF | 0.896 |
| TL | 2.155 |

[Conditional Expressions]

Conditional expression (4) L4R2/f = 107.133
Conditional expression (5) (L5R1 + L4R2)/(L5R1 − L4R2) = −0.989
Conditional expression (6) L3f/f = 0.488

As Table 9 shows, the optical system WL9 of Example 9 satisfies the conditional expressions (4) to (6).

Figure 21:
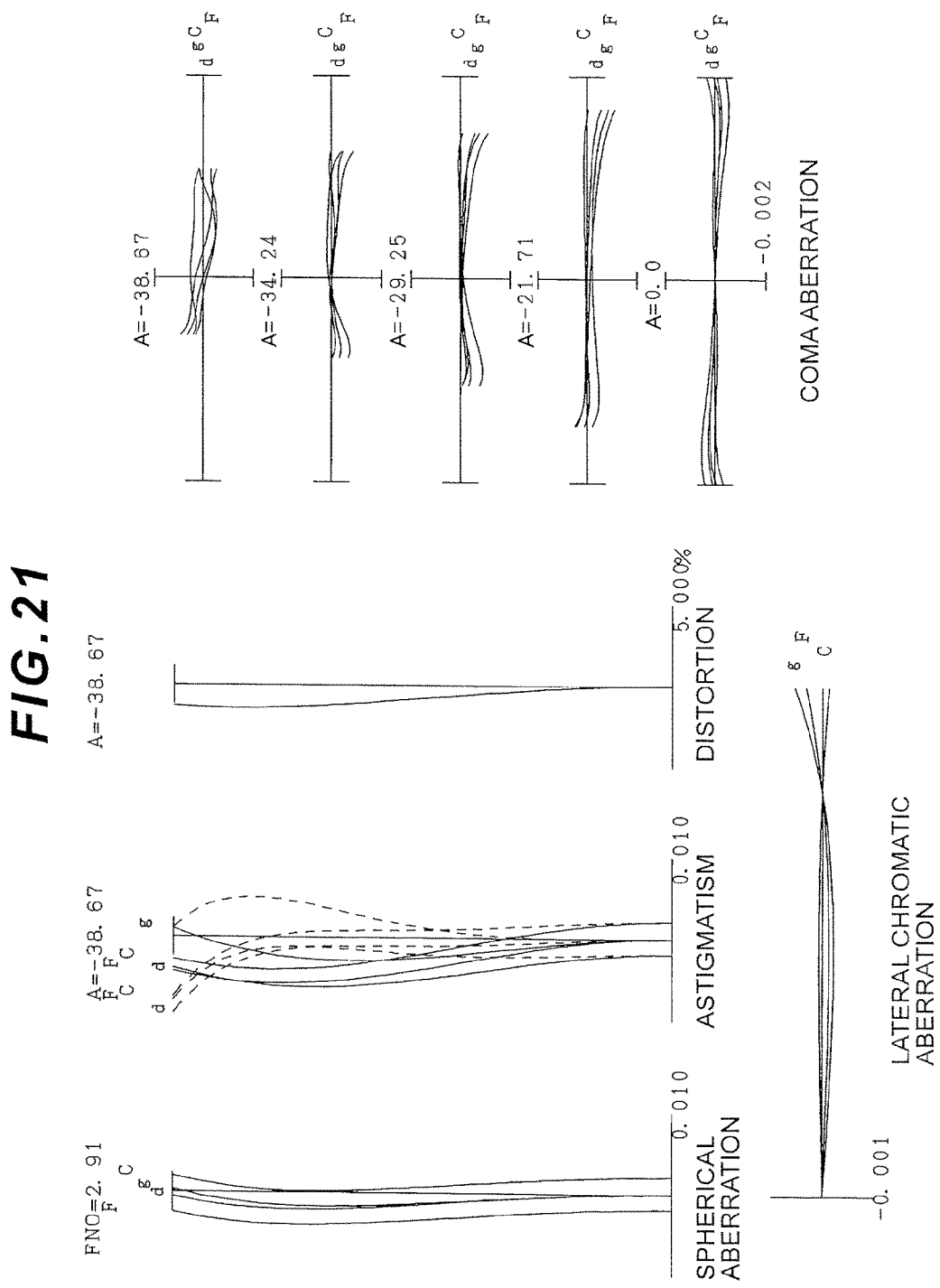
FIG. 21 are graphs showing various aberrations of the optical system according to Example 9 upon focusing on infinity.

FIG. 21 are graphs showing various aberrations (spherical aberration, astigmatism, distortion, coma aberration and lateral chromatic aberration) of the optical system WL9 according to Example 9 upon focusing on infinity. As each graph showing aberrations in FIG. 21 clarifies, various aberrations are corrected satisfactorily, demonstrating that the optical system WL9 according to Example 9 has excellent image forming performance.

According to each example described above, an optical system where the lens barrel can be retracted into the camera when the camera is not used, but which still has compactness, brightness (Fno is about 2.8), a wide angel of view (about 76°), and high optical performance with a small number of constituting lenses, can be implemented.

To assist in understanding the invention, the invention was described using the configuration requirements of the embodiments, but needless to say, the present invention is not limited to these embodiments.

EXPLANATION OF NUMERALS AND CHARACTERS

WL (WL1 to WL9) optical system
L1 first lens
L2 second lens
L3 third lens
L4 fourth lens
L5 fifth lens
L6 sixth lens
S aperture stop
FL filter group
I image plane
CAM digital still camera (optical apparatus)

The invention claimed is:

1. A fixed focal length optical system, comprising a continuous series of six lenses consisting of, in order from an object, consecutively:
a first lens having negative refractive power;
a second lens having positive refractive power;
a third lens having positive refractive power;
a fourth lens having negative refractive power;
a fifth lens having negative refractive power; and
a sixth lens having positive refractive power, and
the following conditional expression being satisfied:

$$0.88 < L4R2/f$$

where L4R2 denotes a radius of curvature of an image side surface of the fourth lens, and f denotes a focal length of the total lens system, and
wherein
the following conditional expression is satisfied:

$$-1.000 < (L5R1 + L4R2)/(L5R1 - L4R2) < -0.310$$

where L5R1 denotes a radius of curvature of an object side surface of the fifth lens,
wherein the first lens is a negative meniscus lens closest to the object and has a concave surface facing the image, and wherein the continuous series of six lenses is devoid of lens elements between successive lenses of the series.

2. The fixed focal length optical system according to claim 1, wherein
the following conditional expression is satisfied:

$$L3f/f < 0.56$$

where L3f denotes a focal length of the third lens.

3. The fixed focal length optical system according to claim 1, wherein
the first lens is a negative meniscus lens having a concave surface facing the image.

4. The fixed focal length optical system according to claim 1, wherein
an image side surface of the lens located closest to the image is aspherical.

5. An optical apparatus including the fixed focal length optical system according to claim 1.

6. The fixed focal length optical system according to claim 1, wherein
the following conditional expressions are satisfied:

$$1.820 \leq L3R1/f3$$

where L3R1 denotes a radius of curvature of an object side lens surface of the third lens, and f3 denotes a focal length of the third lens $$0.10 < n3 - n4 < 0.30$$

where n3 denotes a refractive index of a material of the third lens at the d-line, and n4 denotes a refractive index of a material of the fourth lens at the d-line $$1.00 < \Sigma d/f < 1.30$$

where Σd denotes a distance on the optical axis from a lens surface closest to the object to a lens surface closest to the image in the optical system, and f denotes a focal length of the total lens system
or
the following conditional expressions are satisfied:

$$0.88 < L4R2/f$$

where L4R2 denotes a radius of curvature of an image side surface of the fourth lens, and f denotes a focal length of the total lens system $$-1.000 < (L5R1 + L4R2)/(L5R1 - L4R2) < -0.310$$

where L5R1 denotes a radius of curvature of an object side surface of the fifth lens $$L3f/f<0.56$$

where L3f denotes a focal length of the third lens.

7. The fixed focal length optical system according to claim 1, wherein
the fifth lens is a concave lens or a negative meniscus lens having a concave surface facing the object.

8. A method for manufacturing a fixed focal length optical system including a continuous series of six lenses consisting of, in order from an object, consecutively, a first lens having negative refractive power, a second lens having positive refractive power, a third lens having positive refractive power, a fourth lens having negative refractive power, a fifth lens having negative refractive power, and a sixth lens having positive refractive power,
the method comprising assembling each lens in a lens barrel so as to satisfy the following conditional expression:

$$0.88<L4R2/f$$

where L4R2 denotes a radius of curvature of an image side surface of the fourth lens, and f denotes a focal length of the total lens system,
wherein
the following conditional expression is satisfied:

$$-1.000<(L5R1+L4R2)/(L5R1-L4R2)<-0.310$$

where L5R1 denotes a radius of curvature of an object side surface of the fifth lens, and
wherein the first lens is a negative meniscus lens closest to the object and has a concave surface facing the image, and wherein the continuous series of six lenses is devoid of lens elements between successive lenses of the series.

9. A fixed focal length optical system, comprising a continuous series of six lenses consisting of, in order from an object, consecutively:
a first lens having negative refractive power;
a second lens having positive refractive power;
a third lens having positive refractive power;
a fourth lens having negative refractive power;
a fifth lens having negative refractive power; and
a sixth lens having positive refractive power, and
the following conditional expressions being satisfied:

$$1.52<L3R1/f3$$

$$-1.000<(L5R1+L4R2)/(L5R1-L4R2)<-0.310$$

where L3R1 denotes a radius of curvature of an object side lens surface of the third lens,
f3 denotes a focal length of the third lens, and
L5R1 denotes a radius of curvature of an object side surface of the fifth lens, and
L4R2 denotes a radius of curvature of an image side surface of the fourth lens,
wherein the first lens is a negative meniscus lens closest to the object and has a concave surface facing the image,
wherein the continuous series of six lenses is devoid of lens elements between successive lenses of the series, and
wherein the fifth lens is a bi-concave lens or a negative lens having a concave surface facing the object.

10. The fixed focal length optical system according to claim 9, wherein
the third lens and the fourth lens constitute a cemented lens, and satisfy the following conditional expression:

$$0.10<n3-n4<0.30$$

where n3 denotes a refractive index of a material of the third lens at the d-line, and n4 denotes a refractive index of a material of the fourth lens at the d-line.

11. The fixed focal length optical system according to claim 9, wherein
the second lens is a positive meniscus lens having a convex surface facing the object.

12. The fixed focal length optical system according to claim 9, wherein
the following conditional expression is satisfied:

$$1.00<\Sigma d/f<1.30$$

where $\Sigma d$ denotes a distance on the optical axis from a lens surface closest to the object to a lens surface closest to the image in the optical system, and f denotes a focal length of the total lens system.

13. The fixed focal length optical system according to claim 9, wherein
a lens surface closest to the image is aspherical.

14. An optical apparatus including the fixed focal length optical system according to claim 9.

15. A method for manufacturing a fixed focal length optical system including a continuous series of six lenses consisting of, in order from an object, consecutively, a first lens having negative refractive power, a second lens having positive refractive power, a third lens having positive refractive power, a fourth lens having negative refractive power, a fifth lens having negative refractive power, and a sixth lens having positive refractive power,
the method comprising assembling each lens in a lens barrel so as to satisfy the following conditional expressions:

$$1.52<L3R1/f3$$

$$-1.000<(L5R1+L4R2)/(L5R1-L4R2)<-0.310$$

where L3R1 denotes a radius of curvature of an object side lens surface of the third lens,
f3 denotes a focal length of the third lens,
L5R1 denotes a radius of curvature of an object side surface of the fifth lens, and
L4R2 denotes a radius of curvature of an image side surface of the fourth lens,
wherein the first lens is a negative meniscus lens closest to the object and has a concave surface facing the image,
wherein the continuous series of six lenses is devoid of lens elements between successive lenses of the series, and
wherein the fifth lens is a bi-concave lens or a negative lens having a concave surface facing the object.

16. A fixed focal length optical system, comprising a continuous series of six lenses consisting of, in order from an object, consecutively:
a first lens having negative refractive power;
a second lens having positive refractive power;
a third lens having positive refractive power;
a fourth lens having negative refractive power;
a fifth lens having negative refractive power; and
a sixth lens having positive refractive power, and
the following conditional expressions being satisfied:

$$1.52<L3R1/f3$$

$$0.88<L4R2/f$$

where L3R1 denotes a radius of curvature of an object side lens surface of the third lens, f3 denotes a focal length of the third lens, L4R2 denotes a radius of curvature of an image side surface of the fourth lens, and f denotes a focal length of the total lens system, wherein the first lens is a negative meniscus lens closest to the object and has a concave surface facing the image, wherein the continuous series of six lenses is devoid of lens elements between successive lenses of the series, and wherein the fifth lens is a bi-concave lens or a negative lens having a concave surface facing the object.

17. The fixed focal length optical system according to claim 16, wherein the third lens and the fourth lens constitute a cemented lens, and satisfy the following conditional expression:

$$0.10<n3-n4<0.30$$

where n3 denotes a refractive index of a material of the third lens at the d-line, and n4 denotes a refractive index of a material of the fourth lens at the d-line.

18. The fixed focal length optical system according to claim 16, wherein the second lens is a positive meniscus lens having a convex surface facing the object.

19. The fixed focal length optical system according to claim 16, wherein the following conditional expression is satisfied:

$$1.00<\Sigma d/f<1.30$$

where $\Sigma d$ denotes a distance on the optical axis from a lens surface closest to the object to a lens surface closest to the image in the optical system, and f denotes the focal length of the total lens system.

20. The fixed focal length optical system according to claim 16, wherein a lens surface closest to the image is aspherical.

21. An optical apparatus including the fixed focal length optical system according to claim 16.

22. A method for manufacturing a fixed focal length optical system including a continuous series of six lenses consisting of, in order from an object, consecutively, a first lens having negative refractive power, a second lens having positive refractive power, a third lens having positive refractive power, a fourth lens having negative refractive power, a fifth lens having negative refractive power, and a sixth lens having positive refractive power, the method comprising assembling each lens in a lens barrel so as to satisfy the following conditional expressions:

$$1.52<L3R1/f3$$

$$0.88<L4R2/f$$

where L3R1 denotes a radius of curvature of an object side lens surface of the third lens, f3 denotes a focal length of the third lens, L4R2 denotes a radius of curvature of an image side surface of the fourth lens, and f denotes a focal length of the total lens system, wherein the first lens is a negative meniscus lens closest to the object and has a concave surface facing the image, wherein the continuous series of six lenses is devoid of lens elements between successive lenses of the series, and wherein the fifth lens is a bi-concave lens or a negative lens having a concave surface facing the object.

* * * * *